US011051912B2

(12) United States Patent
Martz et al.

(10) Patent No.: US 11,051,912 B2
(45) Date of Patent: Jul. 6, 2021

(54) FABRICATION OF DENTAL APPLIANCES

(71) Applicant: Archform Inc., Bakersfield, CA (US)

(72) Inventors: Andrew S. Martz, Bakersfield, CA (US); Martin G. Martz, Bakersfield, CA (US); Kan Wu, Hong Kong (HK)

(73) Assignee: Archform Inc., Sunnyvale, CA (US)

( * ) Notice: Subject to any disclaimer, the term of this patent is extended or adjusted under 35 U.S.C. 154(b) by 337 days.

(21) Appl. No.: 15/960,442

(22) Filed: Apr. 23, 2018

(65) Prior Publication Data
US 2018/0303581 A1 Oct. 25, 2018

Related U.S. Application Data

(60) Provisional application No. 62/488,669, filed on Apr. 21, 2017.

(51) Int. Cl.
*A61C 7/00* (2006.01)
*A61C 7/08* (2006.01)
*A61C 9/00* (2006.01)
*A61C 7/14* (2006.01)
*A61C 13/00* (2006.01)

(52) U.S. Cl.
CPC .............. *A61C 7/002* (2013.01); *A61C 7/08* (2013.01); *A61C 7/146* (2013.01); *A61C 9/0006* (2013.01); *A61C 9/0046* (2013.01); *A61C 13/0013* (2013.01)

(58) Field of Classification Search
CPC ........... A61C 7/002; A61C 7/08; A61C 7/146; A61C 9/0006; A61C 9/0046; A61C 13/0013

USPC .......................................................... 433/24
See application file for complete search history.

(56) References Cited

U.S. PATENT DOCUMENTS

| 5,975,893 | A  | * | 11/1999 | Chishti | B33Y 80/00 |
| 6,398,548 | B1 | * | 6/2002 | Muhammad | B33Y 80/00 |
| 2006/0286501 | A1 | * | 12/2006 | Chishti | A61C 7/00 433/24 |
| 2008/0026338 | A1 | | 1/2008 | Cinader | |

(Continued)

OTHER PUBLICATIONS

Qi et al.: "PointNet: Deep Learning on Point Sets for 3D Classification and Segmentation" arXiv:1612.00593v2 [cs.CV], Apr. 10, 2017, 19 pages.

(Continued)

*Primary Examiner* — Matthew M Nelson
(74) *Attorney, Agent, or Firm* — Wallenfelt Law PLC

(57) ABSTRACT

Systems and method for fabrication of dental appliances are provided. An example method includes receiving data identifying approximate locations of individual teeth in a three-dimensional digital dental model representing an impressioned position of a patient's dentition. The example method may also include generating component models corresponding to individual teeth for each of the identified approximate locations. The component models may be disposed at initial positions based on the impressioned position of the patient's dentition. The example method also includes determining target positions for the component models and generating a tooth-positioning appliance design based on the determined target positions for the component models. The method may also include causing a tooth-positioning appliance to be fabricated based on the tooth-positioning appliance design.

20 Claims, 21 Drawing Sheets

(56) References Cited

U.S. PATENT DOCUMENTS

| | | | |
|---|---|---|---|
| 2008/0044786 A1* | 2/2008 | Kalili | A61C 7/08 433/6 |
| 2008/0064008 A1* | 3/2008 | Schmitt | B33Y 50/00 433/140 |
| 2010/0151404 A1* | 6/2010 | Wu | A61C 9/0053 433/24 |
| 2013/0095446 A1* | 4/2013 | Andreiko | A61C 7/08 433/6 |
| 2013/0230818 A1* | 9/2013 | Matov | A61C 7/00 433/3 |
| 2015/0157421 A1* | 6/2015 | Martz | A61C 7/08 433/6 |
| 2015/0257856 A1* | 9/2015 | Martz | A61C 7/14 433/6 |
| 2016/0008095 A1* | 1/2016 | Matov | A61C 7/16 433/6 |
| 2017/0065373 A1* | 3/2017 | Martz | B33Y 80/00 |
| 2017/0100214 A1* | 4/2017 | Wen | G06F 19/3481 |
| 2017/0178327 A1* | 6/2017 | Somasundaram | A61B 5/4547 |

OTHER PUBLICATIONS

Qi et al.: "PointNet++: Deep Hierarchical Feature Learning on POint SEts in a Metric Space," arXiv:1706.02413v1 [cs.CV], Jun. 7, 2017, 14 pages.

International Search Report and Written Opinion for PCT Application No. PCT/US2018/028955, dated Aug. 8, 2018, 16 pages.

* cited by examiner

630

710

670

FABRICATION OF DENTAL APPLIANCES

CROSS REFERENCE TO RELATED APPLICATIONS

This application claims priority to, and the benefit of, U.S. Patent Application No. 62/488,669, filed on Apr. 21, 2017, entitled, "Fabrication of Dental Appliances," the disclosure of which is incorporated by reference herein in its entirety.

BACKGROUND

Therapeutic dental appliances may be used in the treatment of various dental conditions. Non-limiting examples of therapeutic dental appliances include orthodontic appliances, such as orthodontic aligners and orthodontic retainers, and splints, such as surgical splints and occlusal splints. Therapeutic dental restorations are used by patients for many reasons, including to improve or restore function, to aesthetically improve a patient's dentition, to reduce wear on teeth, and to treat joint pain and other medical conditions.

For example, orthodontic aligners are used to reposition teeth during orthodontic treatment. It should be noted that the terms aligner, positioner, and tooth-positioning appliance are largely synonymous as used in the orthodontic field. This type of orthodontic treatment typically uses separate tooth-positioning appliances for the upper and lower teeth. The tooth-positioning appliances fit over the teeth, covering at least some of the facial and lingual surfaces of some or all of the teeth, and often at least some of the occlusal (or biting surfaces) of the teeth.

SUMMARY

In general terms, this disclosure is directed to the fabrication of dental appliances. In a non-limiting example, the dental appliances are orthodontic aligners configured to alter the positions of a patient's teeth.

One aspect a method comprising: receiving data identifying approximate locations of individual teeth in a three-dimensional digital dental model representing an impressioned position of a patient's dentition; generating component models corresponding to individual teeth for each of the identified approximate locations, the component models being disposed at initial positions based on the impressioned position of the patient's dentition; determining target positions for the component models; generating a tooth-positioning appliance design based on the determined target positions for the component models; and causing a tooth-positioning appliance to be fabricated based on the tooth-positioning appliance design.

Another aspect is a system comprising: at least one memory including instructions; and at least one processor that is operably coupled to the at least one memory and that is arranged and configured to execute instructions that, when executed, cause the at least one processor to: receive data identifying approximate locations of individual teeth in a three-dimensional digital dental model representing an impressioned position of a patient's dentition; generate component models corresponding to individual teeth for each of the identified approximate locations, the component models being disposed at initial positions based on the impressioned position of the patient's dentition; determine target positions for the component models; generate a tooth-positioning appliance design based on the determined target positions for the component models; and transmit data corresponding to the tooth-positioning appliance design to a rapid fabrication machine.

Yet another aspect is a method comprising: generating component models from a three-dimensional digital dental model of a patient's dentition using a neural network system, the component models corresponding to individual teeth of the patient; determining target positions for the component models; generating a tooth-positioning appliance design based on the determined target positions for the component models; and causing a tooth-positioning appliance to be fabricated based on the tooth-positioning appliance design.

BRIEF DESCRIPTION OF THE DRAWINGS

Like reference symbols in the various drawings indicate like elements.

DETAILED DESCRIPTION

Figure 1:
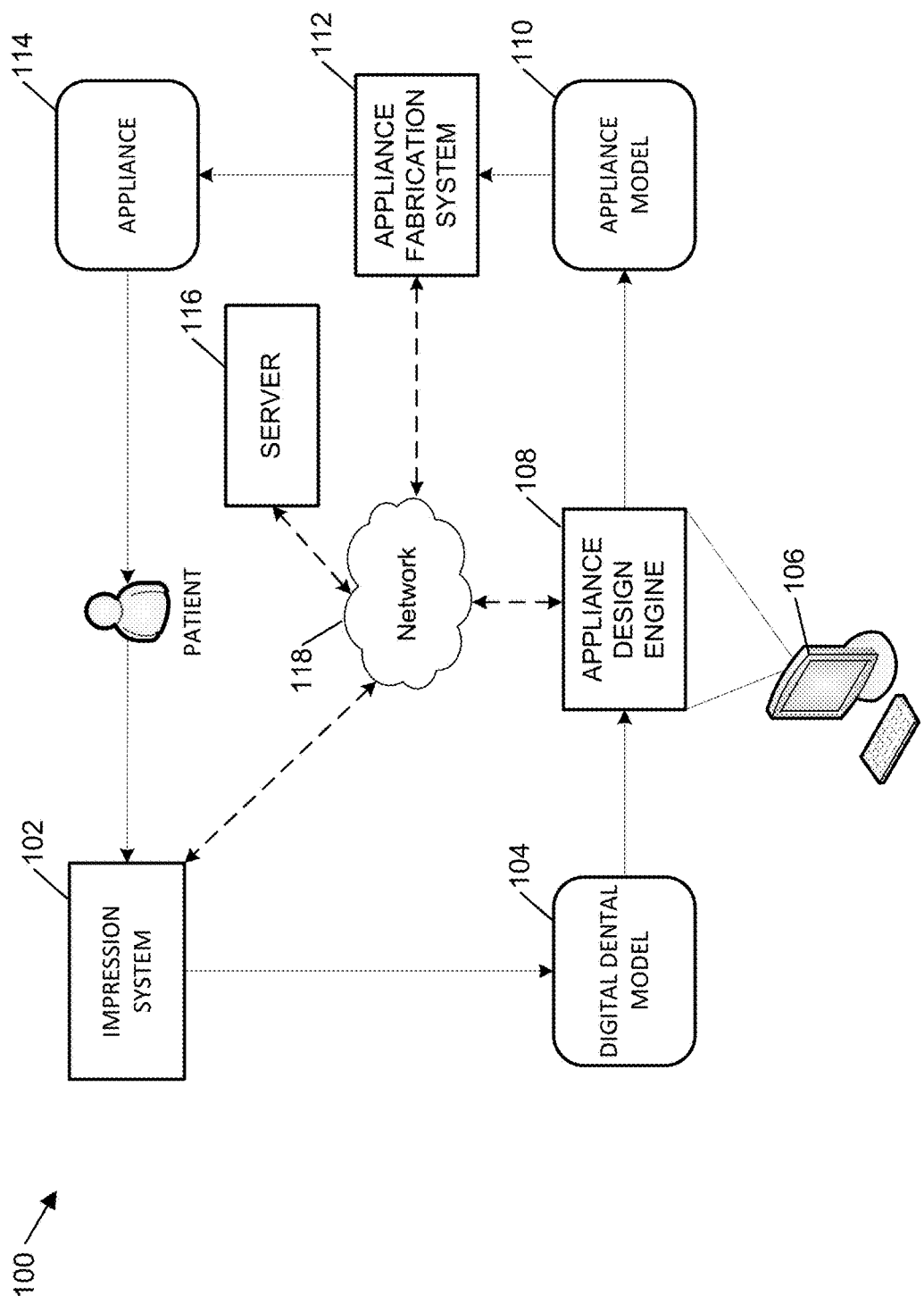
FIG. 1 is a schematic block diagram illustrating an example of a system for fabricating a dental appliance.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to fabrication of dental appliances that are usable to provide therapy to a patient. In particular, the present disclosure relates to fabrication of orthodontic appliances such as orthodontic aligners. For example, the technology disclosed herein can be used to generate a series of removable orthodontic aligners to reposition a patient's teeth over time. The technology can be used to fabricate the appliance fully or partially within an office of a medical professional. Beneficially, medical professionals can provide the appliance to the patient more quickly and can have more control over the design of the appliance using this technology.

Orthodontic positioners (or aligners) are often traditionally made from a set of plaster models derived from three-dimensional (3D) negative dental impressions of a patient's teeth. The plaster dental models are then modified by cutting the teeth apart using a small jeweler's saw or rotary cutting discs, followed by repositioning the plaster teeth in a better, straighter, desired arrangement, and then holding the teeth in the new arrangement with dental wax.

The repositioned teeth molds provide the basis for manufacturing the positioners. The resilience of the material from which the positioner is made provides the energy to move the teeth from their original position toward the new straightened position. A series of aligners may be made to move the teeth in incremental steps. Making a series of appliances is difficult, time-consuming, and error-prone when the tooth arrangement for each step must be made by hand using plaster and wax.

Digital technologies can be used to over at least some of the difficulties associated with fabricating a series of aligners that move teeth incrementally. Computer Aided-Design (CAD)/Computer-Aided Manufacturing (CAM) software can be used to produce tooth models, from which a progressive series of appliances can be manufactured. The tooth models can be generated from 3D images of the patient's dentition. These tooth models can then be repositioned and used to form aligners. For example, the repositioned tooth models can be used to fabricate dental models upon which aligners are formed using a combination of vacuum, pressure, and heat. This forming process is informally referred to within the orthodontic laboratory community as the "suck down" process.

In one process for producing a series of aligners, a technician first scans a patient's upper and lower model set to obtain CAD-manipulatable virtual models of a patient's dental anatomy. A model set normally consists of one upper and one lower plaster model of the teeth, palate, and gums. Once the virtual model of the original malocclusion has been obtained, a technician will then undertake steps involving extensive manipulation of the virtual malocclusion. This involves extensive repositioning of the teeth according to a comprehensive and sequential procedure, ultimately arriving at a finished or ideal occlusion for that patient. The finished occlusion in the virtual model is consistent with the complete repositioning of the patient's upper and lower occlusion that would result at the end of successful conventional orthodontic treatment. After the steps described above are accomplished, the technician possesses two versions of the patient's teeth available within the virtual CAD environment. One version represents the original malocclusion and the other represents the ideal occlusion. In other words, the technician has models representing the beginning and end states of the patient's teeth.

Another step in the process involves the creation of an incremental, progressive series of physical forming models. Each of these forming models represents a snapshot of the patient's future occlusion at specific incremental steps along the patient's proposed treatment sequence between the beginning and the end conditions as described above. To accomplish this, the technician creates a virtual first transition model. This virtual first transition model represents some or all of the teeth being subtly moved from their original pre-treatment positions to a virtual first transition position that is in the direction of their intended finished positions. Additional virtual transition models can be created similarly. In this manner, the technician creates a series of progressive models, with each biased slightly further than the previous one, and each moves the teeth slightly closer to their finished target positions. A final forming model will take the teeth from the series of transition positions and move them into their final, desired positions.

Once such a series of virtual intermediate forming models has been created and a final forming model has been created by the technician, digital code representing each of the models in the series is directed to operate a rapid prototyping machine. Within a rapid prototyping machine, the series of physical forming models are produced using any of a number of conventional processes, such as computer numerically-controlled (CNC) machining, stereo lithography, or 3D printing. The production step results in the production of hard, physical models that correspond to each of the series of virtual intermediate models and the final model.

In another step of the process, each of the series of physical models is mounted in a vacuum machine (also referred to as a suck-down machine) where a combination of pressure, heat, and vacuum is used to form the actual series of progressive aligners from plastic sheet material of a constant thickness. Once the series of progressive aligners are formed and trimmed, they are sequentially labeled, packaged, and shipped to the attending orthodontist. The orthodontist then schedules an appointment for the patient, at which time the aligners and instructions for their use are given to the patient. The patient is instructed to wear the first set of aligners for a period of time, typically two weeks.

After that, the first set is discarded and the patient transitions to the next set of the series and so on.

The aligners can be configured to urge the patient's teeth to move according to the positional biases created virtually by the technician. The teeth are progressively biased and urged to move in desired directions toward their predetermined finished positions by the resilience of the polymeric material of the aligner. Ideally, gentle but continuous forces would be delivered by the aligners, causing certain physiological processes involving the creation and/or restoration of the bone supporting the roots of the teeth to take place. The net result should be the slow, progressive orthodontic movement of the roots of the teeth through the underlying bone toward desirable positions and orientations.

Many conventional removable aligners are limited by their design and the mechanical properties of the clear thermoplastic materials that are currently utilized. Clear polymeric materials make the aligner nearly invisible, and that is a great advantage over fixed stainless steel hardware and metal braces. On the other hand, conventional polymeric materials used in forming aligners have a very limited ability to flex in all directions. This is particularly problematic when aligning teeth that are not fairly well lined up in the beginning of treatment. Recent published studies have shown that each stage of conventional aligners deliver fairly high forces when they are first delivered, and then the applied forces diminish rapidly. This results in intermittent force delivery rather than the desired light, continuous, gentle forces.

Even when very small movements during each stage are attempted, the appliance may fail to properly engage teeth that need to be moved because the appliance is not adequately flexible and is not designed to allow movement within the plane of the material. If a specific aligner fails to properly engage a tooth, then that tooth will not move to the proper place to engage the next successive aligner in the series. The only present solutions available when aligners fail to properly engage a tooth are: (1) reduce the amount of movement attempted for that specific stage; or (2) place a larger bonded attachment on the tooth. Both of these solutions typically require reworking the computerized treatment plan. If the plan is not revised, with each successive stage of the appliance, the fit of the aligners deteriorates, and after just a few stages, it becomes obvious that the teeth are not moving according to the original computerized treatment plan, forcing a revision of the treatment plan. The ability of the appliance to precisely engage individual teeth, whether they are to be moved, or if they are to be used as anchor teeth to assist in the movement of other teeth is critical to the success of orthodontic treatment.

FIG. 1 is a schematic block diagram illustrating an example of a system 100 for fabricating a dental appliance 114. The example system 100 includes an impression system 102, an appliance design system 106, an appliance fabrication system 112, and a server 116. Although alternatives are possible, the components of the system 100 can all be located in a dental or orthodontic office, in which patients receive orthodontic treatment. Alternatively, at least some of the components illustrated in FIG. 1 can be disposed in a dental or orthodontic laboratory. In some embodiments, two or more of the impression system 102, appliance design system 106, and appliance fabrication system 112 are combined in a single device. In some embodiments, two or more of the impression system 102, an appliance design system 106, an appliance fabrication system 112 are all connected to the same wireless local area network and communicate with each other using a wireless communication protocol without accessing the Internet.

The example impression system 102 generates a digital dental model 104 of the dentition of a patient. The digital dental model 104 is a geometric representation of the dentition of the patient. In some embodiments, the digital dental model 104 is represented by one or more of a point cloud, a polygonal mesh, a parametric model, or voxel data. Although alternatives are possible, the digital dental model 104 can be generated directly from the dentition of the patient, using, for example, an intraoral scanner. Example intraoral scanners include, for example, the TRIOS Intra Oral Digital Scanner, the Lava Chairside Oral Scanner C.O.S., the Cadent iTero scanner, the Cerec AC scanner, the Cyrtina IntraOral Scanner, the Lythos Digital Impression System from Ormco, and the Dental Wings Intraoral Scanner.

In some embodiments, a digital dental model 104 is generated using other imaging technologies, such as computed tomography (CT) or magnetic resonance imaging (MRI). In yet other embodiments, the digital dental model 104 is generated from a physical impression. In some embodiments, physical impressions are captured using an impression material, such as sodium alginate, vinyl polysiloxane, or another type of impression material. The digital dental model 104 is then generated by scanning either the physical impression or a plaster model of the dentition of the patient created from the physical impression. Examples of technologies for scanning a physical impression or model include 3D laser scanners and computed tomography (CT) scanners.

The appliance design system 106 is a system that generates an appliance model 110 based on the digital dental model 104. In some embodiments, the appliance design system 106 includes a computing device including user input devices. The appliance design system 106 includes an appliance design engine 108. The appliance design engine 108 may generate a treatment plan and based on that treatment plan generate an appliance model 110 that is transmitted to the appliance fabrication system 112 for fabrication.

The appliance model 110 can include one or more 3D models of dental appliances. In some embodiments, the appliance model 110 includes a 3D upper model for the patient's upper dentition and a 3D lower model for the patient's lower dentition. In some embodiments, the appliance model 110 includes 3D models for a series of orthodontic aligners that are configured to incrementally move the patient's teeth to target positions. In some embodiments, the appliance model 110 is represented by one or more of a point cloud, a polygonal mesh, a parametric model, or voxel data.

In addition to the appliance model 110, the appliance design engine 108 may also generate other appliance design data. For example, the appliance design engine 108 can also generate appliance design data that includes incremental positions and target tooth positions for the patient. In some embodiments, the appliance design engine 108 then accesses this data at a later point in the patient's treatment, for example, to aid in evaluating treatment progress, to modify the treatment plan, or to generate additional appliance models. Additionally, the appliance design engine 108 can also generate appliance design data that includes information about structural elements such as size, shape, orientation, and position for one or more bonded attachments that are to be bonded to the patient's teeth during treatment. In some embodiments, the appliance model 110 is formed to fit to these bonded attachments to aid in moving some of the patient's teeth. In some embodiments, the appliance design data generated by the appliance design engine 108 is stored locally on the appliance design system or on the server 116, where the data can be accessed during future appointments with the patient.

In some embodiments, the appliance design system 106 segments the digital dental model 104 into component models corresponding to the patient's teeth, aligns the component models to generate a treatment plan, and forms an appliance design. Some or all of these steps may be performed in an automated manner (i.e., without operator input) as described further below. Additionally, in some embodiments, the appliance design engine generates user interfaces or causes user interfaces to be displayed through which a user can provide input to control at least parts of some of these steps.

As noted above, the appliance design engine 108 can define incremental tooth positions based on the current positions of the teeth as reflected in the digital dental model 104 and the determined target tooth positions. The target tooth positions may be determined based on arranging features of the component models that represent individual teeth along an arch form. In addition to aligning the features of the component models, the component models may also be oriented in a common manner or according to a pattern. For example, a machine learning module may determine a local coordinate system for each of the component models (e.g., the local coordinate system may define occlusal, labial/buccal, and mesial directions for the tooth representing the component model). A machine learning module may also identify features or landmarks on the component models. Example of the features includes cusps and grooves. The component models may then be arranged along an arch form and oriented so that the occlusal surfaces of the component models fit a plane or desired shape. In some implementations, the component models are arranged so that the cusps of the teeth upper dental arch fit in the grooves of the teeth of the lower dental arch and vice-versa.

In some embodiments, the incremental tooth positions are based on simulation using a physics model of orthodontic treatment. The appliance design engine 108 may generate an appliance model 110 that includes 3D shape data that represents an orthodontic appliance for at least one of the incremental tooth positions in a format suitable for fabrication using the appliance fabrication system 112.

Although alternatives are possible, the appliance design engine 108 typically includes computer-aided-design (CAD) software that generates a graphical display of one or both of the digital dental model 104 and the appliance model 110 and allows an operator to interact with and manipulate one or both of the digital dental model 104 and the appliance model 110.

The appliance design engine 108 can also include digital tools that mimic the tools used by a laboratory technician to physically plan a treatment and design a dental appliance. The appliance design engine 108 can also include tools to add or modify features of the appliance design, such as loops, tabs, slots, flexible zones, and so forth.

Once the appliance model 110 is designed using the appliance design engine 108, the appliance model 110 is sent to the appliance fabrication system 112 where the appliance 114 is produced. In some embodiments, multiple of the appliance model 110 are generated that correspond to multiple incremental tooth positions (e.g., the first two incremental tooth positions) and used to fabricate multiple of the appliance 114. The patient is then given the multiple appliances for multiple sequential stages of incremental tooth movement. The patient will then receive additional appliances for additional incremental tooth movement during follow-up appointments. The additional appliances may be generated from the original digital dental model 104 or may be generated based on an updated digital dental model 104 that is acquired during a follow-up appointment using the impression system 102. In this manner, the system 100 can allow for adjustment of the treatment plan and the incremental tooth positions within the treatment plan during follow-up visits (e.g., when one or more teeth are moving more slowly than original anticipated).

Although alternatives are possible, the appliance fabrication system 112 typically includes one or more rapid fabrication machines. Rapid fabrication machines produce physical parts such as the dental appliances described herein in a short amount of time compared to traditional fabrication processes or with less human labor than traditional fabrication processes. Examples of rapid fabrication machines include 3D printers, such as the ProJet line of printers from 3D Systems, Inc. of Rock Hill, S.C. Another example of a rapid fabrication machine is stereolithography equipment. Still another example of a rapid fabrication machine is a digital light processing (DLP) rapid prototyping system, such as the Perfactory system from EnvisionTEC, Inc. of Dearborn, Mich. Yet another example of a rapid fabrication machine is a milling device, such as a computer numerically controlled (CNC) milling device. In some embodiments, the appliance fabrication system 112 is configured to receive files in the stereolithography (.STL) file format. In some embodiments, the appliance fabrication system 112 includes milling equipment for milling a biocompatible plastic material that can be placed in the patient's mouth. In these embodiments, the appliances 114 are milled from a biocompatible plastic material.

The impression system 102, appliance design engine 108, appliance fabrication system 112, and server 116 may communicate with each other over a network. The network 118 is an electronic communication network. An electronic communication network is a set of computing devices and links between the computing devices. The computing devices in the network use the links to enable communication among the computing devices in the network. The network 118 can include routers, switches, mobile access points, bridges, hubs, intrusion detection devices, storage devices, stand-alone server devices, blade server devices, sensors, desktop computers, firewall devices, laptop computers, handheld computers, mobile telephones, and other types of computing devices.

In various embodiments, the network 118 includes various types of links. For example, the network 118 can include one or both of wired and wireless links, including Bluetooth, ultra-wideband (UWB), 802.11, ZigBee, and other types of wireless links. Furthermore, in various embodiments, the network 118 is implemented at various scales. For example, the network 118 can be implemented as one or more local area networks (LANs), metropolitan area networks, subnets, wide area networks (such as the Internet), or can be implemented at another scale.

Figure 2:
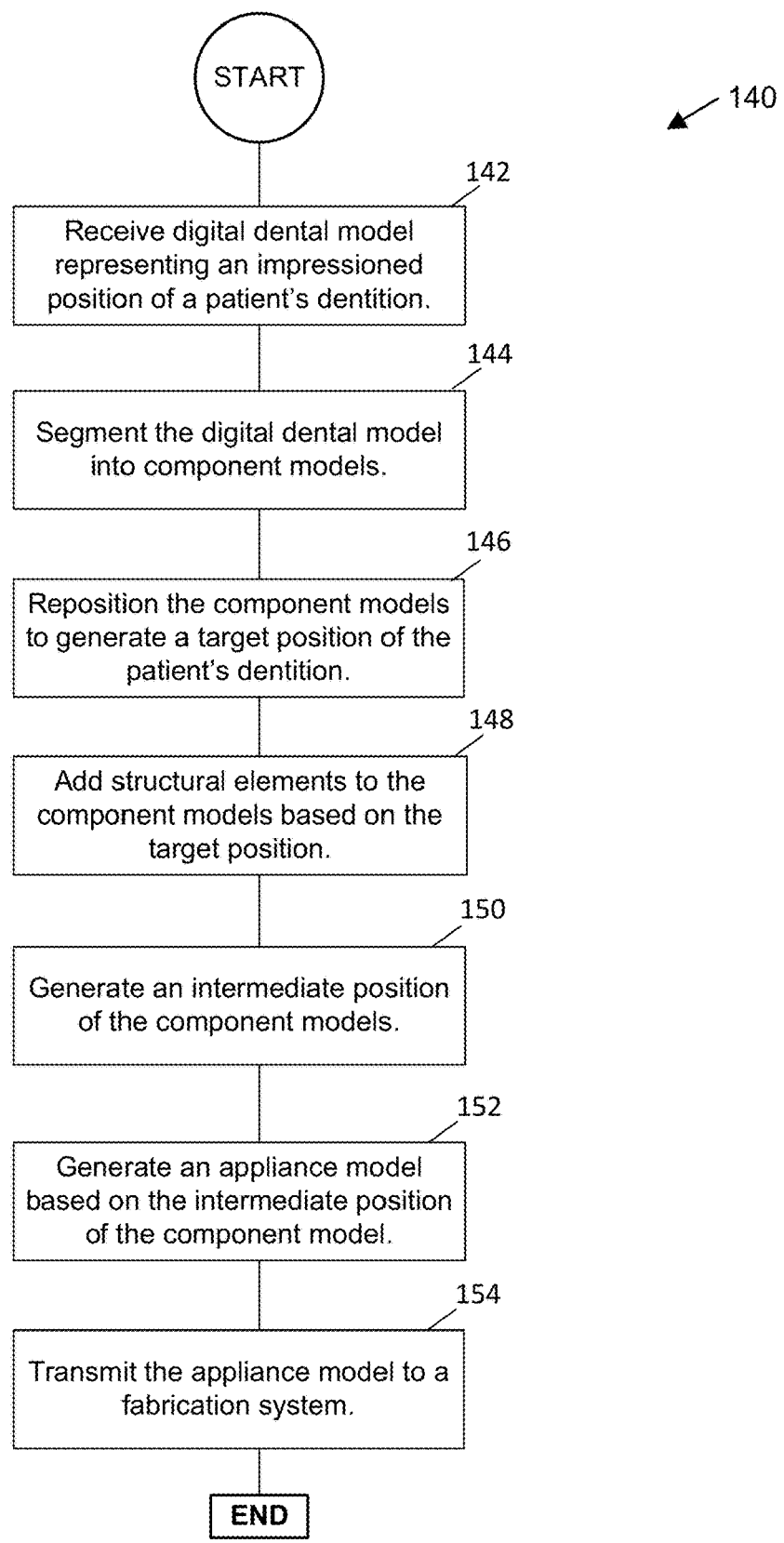
FIG. 2 is a flow chart illustrating an example method of designing an appliance performed by embodiments of the system of FIG. 1.

FIG. 2 is a flow chart illustrating an example method 140 of designing an appliance. The method 140 is performed by embodiments of the appliance design engine 108.

At operation 142, a digital dental model is received. In some embodiments, the digital model represents an impressioned (or initial) position of a patient's dentition as captured by the impression system 102.

At operation 144, the digital dental model is segmented into component models. For example, the component models can represent individual teeth. In some embodiments, in addition to separating the individual tooth models from each other, the component models are also separated from gingival tissue. Examples techniques for segmenting the digital dental model are described herein.

At operation 146, the component models are repositioned to generate a target position of the patient's dentition. For example, the component models may be aligned along an arch form or otherwise. Aligning the component models may include closing spaces between adjacent teeth. In some embodiments, a user interface is generated through which an operator can provide input to, at least in part, control the repositioning of the component models. Additionally, in some embodiments, physical simulations or machine learning techniques are used to reposition the component models. Example methods of aligning component models are described herein.

At operation 148, structural elements are added to the component models, as necessary, based on the target position. An example of a structural element is a bonded attachment. The structural elements may be added based on differences between the initial positions of the component models and the target positions of the component models. In some embodiments, a bonded attachment is added to a component model when the component model moves by more than a threshold amount between the impression position and the target position. Additionally, bonded attachments are added in some embodiments based on specific types of movement (e.g., a torque that exceeds a threshold amount). The thresholds can be uniform for all of the component models or can vary based on an associated tooth type or other factors.

Bonded attachments (also referred to as buttons) are structures that are bonded to the surface of one or more of the patient's teeth. The bonded attachments are typically not removable by the patient during the course of active orthodontic treatment. In some embodiments, bonded attachments have straight edges and have square or rectangular shapes; however, any shape for the bonded attachment can be used. The bonded attachment may be bonded to one or both of the buccal or lingual surfaces of the patient's teeth.

At operation 150, an intermediate arrangement (or position) of the component models is generated. In some embodiments, multiple intermediate arrangements are generated. The intermediate positions represent incremental movements (or movement stages) of the teeth between the initial positions and the target positions.

At operation 152, an appliance design is generated based on an intermediate arrangement of the component models. The appliance design may include one or more structures, such as thin-shell components, that are configured to fit to a portion of the patient's dentition. The appliance design may also include additional elements such as flexible regions that have mesh or lattice structures, connecting loops between regions or thin shell components, and tab-and-slot arrangements to close spaces. The additional elements may be added based on the relative positions of the component models, the types of movement that is to occur during the associated movement stage, or other factors.

At operation 154, the appliance model is transmitted to the fabrication system. In some embodiments, multiple appliance models are transmitted to the fabrication system. These appliances fabricated from the appliance models at intermediate positions are examples of intermediate tooth-positioning appliances.

Figure 3:
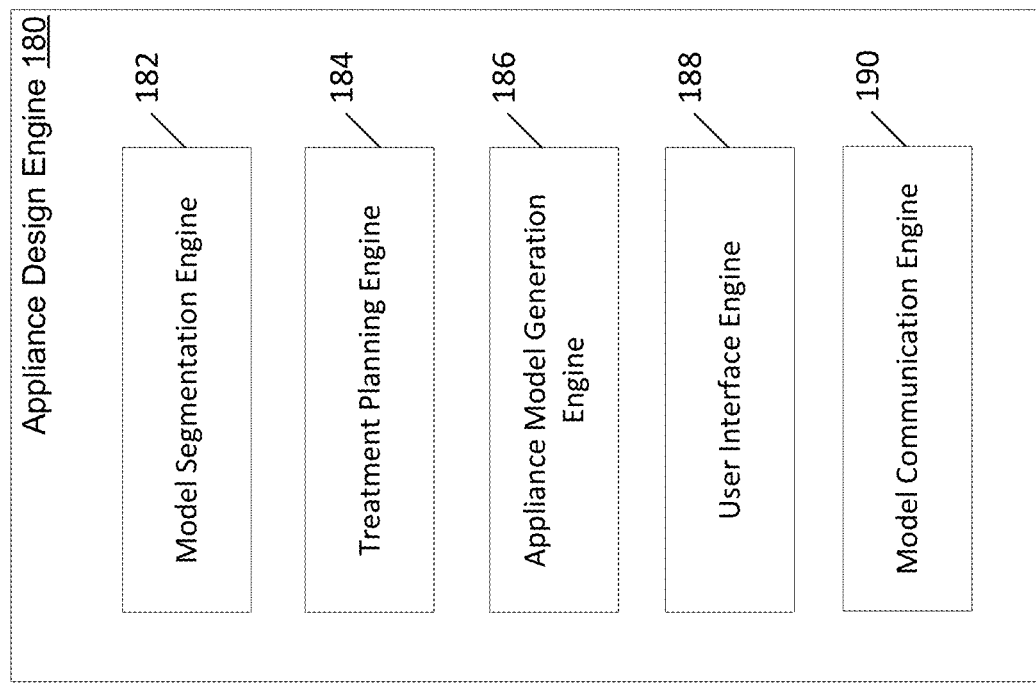
FIG. 3 is a schematic diagram of an example embodiment of the appliance design engine of FIG. 1.

FIG. 3 is a schematic diagram of an example appliance design engine 180. The appliance design engine 180 is an example of the appliance design engine 108. In this example, the appliance design engine 180 includes a model segmentation engine 182, a treatment planning engine 184, an appliance model generation engine 186, a user interface engine 188, and a model communication engine 190.

The model segmentation engine 182 segments a digital dental model into component models. The component models are generated by separating a portion of the digital dental model from the rest of the digital dental model. In some embodiments, the component models include tooth tissue. Additionally, in some embodiments, the component models include tooth tissue and gum tissue. The treatment planning engine 184 generates a treatment plan. In some embodiments, the treatment planning engine 184 may receive user input to define one or more parameters of the treatment and target tooth positions. In some embodiments, the treatment planning engine 184 generates target tooth positions. Additionally, the treatment planning engine 184 can generate intermediate tooth positions (i.e., intermediate arrangements of the component models). The appliance model generation engine 186 generates an appliance model based on the component models and the intermediate or target tooth positions. The user interface engine 188 generates user interfaces through which an operator may interact with and control aspects of the appliance design engine 180. The model communication engine 190 receives and transmits models such as digital dental models and appliance models.

Figure 4:
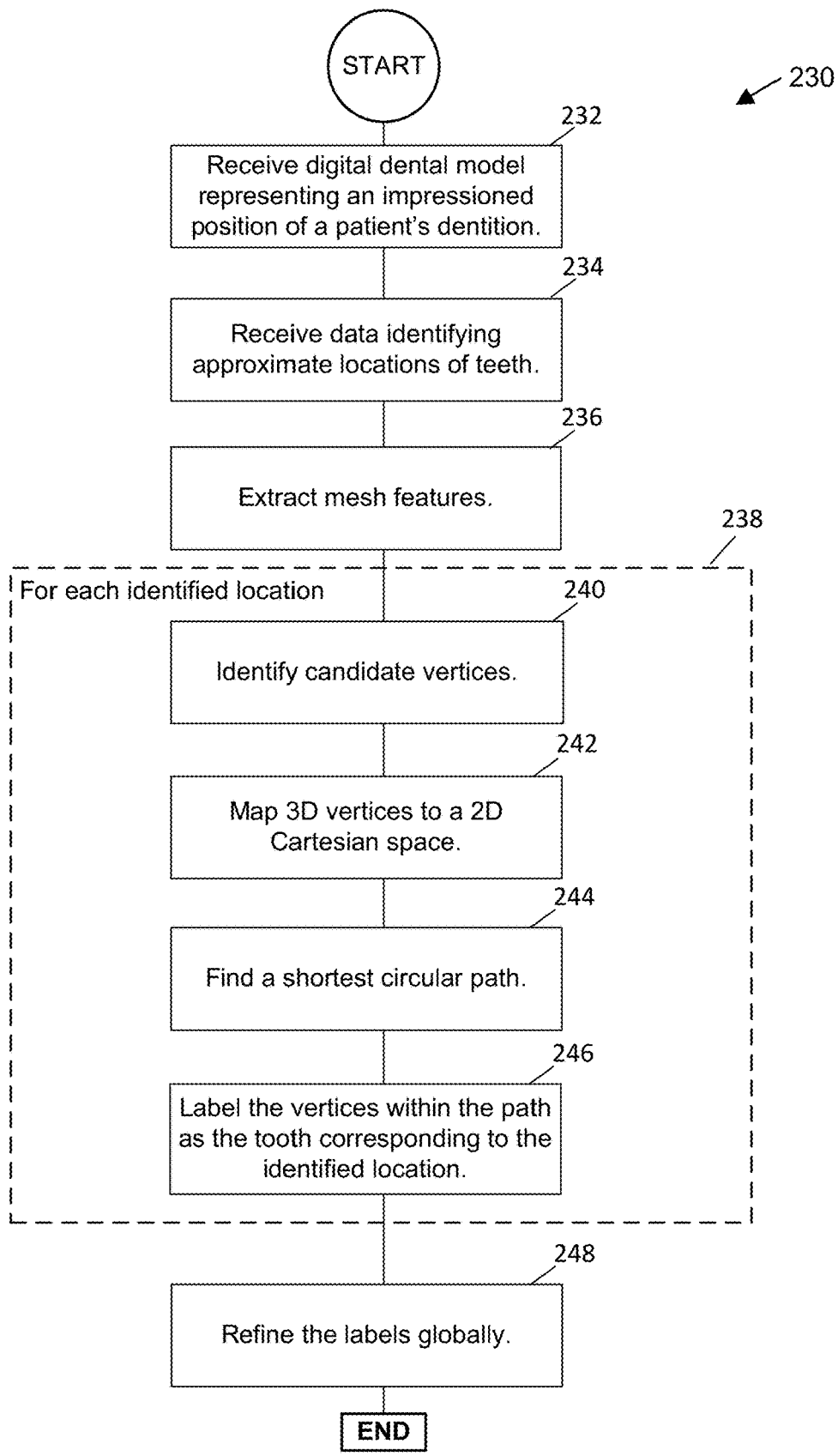
FIG. 4 is a schematic diagram of a method of segmenting a digital dental model performed by embodiments of the appliance design engine of FIG. 1.

FIG. 4 is a schematic diagram of a method 230 of segmenting a digital dental model. The method 230 is performed by embodiments of the appliance design engine 108. For example, the method 230 may be performed by the model segmentation engine 182.

At operation 232, a digital dental model representing an impressioned position of a patient's dentition is received. The model may be received via a network. The model may also be received from a file system, database, etc.

At operation 234, data identifying approximate locations of the patient's teeth are received. In some embodiments, the locations are received via a user interface which is configured to receive inputs from the user identifying approximate locations of the teeth. For example, the user interface may display a graphic representation of the dental model and be configured to receive mouse clicks or touch inputs identifying a point on the surface of each of the teeth. In some embodiments, the approximate locations of the patient's teeth are identified using a neural network. For example, a neural network may operate on a two-dimensional (2D) image of the occlusal surface of one arch of the patient's dentition (e.g., the upper or lower dental arch). The 2D image may be generated from the digital dental model by, for example, rendering the digital dental model.

Neural networks are computational models used in machine learning that are made up of nodes organized in layers. The nodes are also referred to as artificial neurons, or just neurons, and perform a function on provided input values to produce output values. For example, a first layer of a neural network may receive values corresponding to individual pixels from an image of the patient's dentition. In some implementations, points are used as inputs to the first layer of the neural network (e.g., 3D points corresponding to the coordinates of vertices or 2D points corresponding to the coordinates of vertices projected onto a plane). The neurons in the first layer will perform a function on those input values to generate output values. For example, the functions may be based on combining multiple of the input values (e.g., pixel values) based on weighting parameters. In some implementations, the weighting parameters may be different for each neuron in a layer.

Neural networks are computational models used in machine learning that are made up of nodes organized in layers with weighted connections. In some implementations, the nodes of a layer are represented as a matrix of values for the layer. The values for each layer may be calculated based on the values of the previous layer and the weighted connections. The first layer of a neural network receives the input values. For example, a first layer of a neural network may receive values corresponding to individual pixels from an image of the patient's dentition. The neurons in the first layer will perform a function on those input values to generate output values. For example, the function may be based on combining multiple of the input values (e.g., pixel values) based on weighting parameters. In some implementations, the weighting parameters may be different for each neuron in the layer. A layer in a neural network may be fully-connected to the previous layer (or input). In a fully-connected layer, each value in the layer is calculated as an independently adjusted weighted combination of each value in the previous layer.

Training a neural network uses training examples, each example being an input and a desired output, to determine, over a series of iterative rounds, weighting parameters for the connections between layers that increase the likelihood that the neural network will provide the desired output given the input. During each round, the weighting parameters are adjusted to address incorrect output. Once trained, the neural network can be used to predict an output based on a provided input.

A convolutional neural network (CNN) is a neural network in which at least one of the layers of the neural network is a convolutional layer. A convolutional layer is a layer in which the values of a layer are calculated based on applying a kernel function to a subset of the values of a previous layer. Training the neural network may involve adjusting weights of the kernel function based on the training examples. Typically, the same kernel function is used to calculate each value in a specific convolutional layer. Accordingly, there are far fewer weights that must be learned while training a convolutional layer than a fully-connected layer (e.g., a layer in which each value in a layer is a calculated as an independently adjusted weighted combination of each value in the previous layer) in a neural network. Because there are typically fewer weights in the convolutional layer, training and using a convolutional layer may require less memory, processor cycles, and time than would an equivalent fully-connected layer.

In some implementations, sub-images that have the approximate dimensions of teeth are generated from a 2D occlusal image. The sub-images may overlap each other. The sub-images are then classified by a neural network trained to recognize teeth (or specific types of teeth). Classifying the images may include generating a confidence score that corresponds to the likelihood that the image includes a tooth or a specific type of tooth. The sub-images with the highest confidence scores are then recognized as teeth and midpoints of those sub-images may be used as the approximate locations of the patient's teeth. In some implementations, the shapes or sizes of the sub-images having higher confidence scores may be refined to further increase the confidence scores.

At operation 236, features are extracted from the digital dental model. For example, the digital dental model may be represented as or converted to a mesh comprising vertices and faces. In some embodiments, vertex-wise mean curvature measures with each vertex's curvature are calculated as the averaged bi-plane angles for each pair of neighboring faces around that vertex. The calculated mean curvature values can then be used to identify separation boundaries between teeth and gum, or between each pair of neighboring teeth. More specifically, in some embodiments, those vertices with large negative mean curvature values are identified as potential boundary vertices. In some embodiments, the operation 236 is performed on individual component (teeth) models rather than on the combined dental model as part of operation 238.

Then, operation 238 is performed for each identified location. In some embodiments, the operation 238 is performed simultaneously for multiple of the identified locations (e.g., using separate processors or separate processor cores). In some embodiments, operation 238 is performed within a loop to sequentially perform the operation 238 on at least some of the identified locations.

The operation 238 performs tooth segmentation on the tooth corresponding to the identified location in the digital dental model. In some embodiments, the operation 238 performs automatic tooth segmentation based on manifold space transforms. Although alternatives are possible, in this example operation 238 includes operations 240, 242, 244, and 246.

At operation 240, candidate vertices are selected for the identified location. For example, some embodiments identify vertices within a certain distance of the identified location as being potentially part of the tooth. In some embodiments, the candidate vertices are selected within a limited on-mesh geodesic distance (i.e., distance along the mesh surface) to the identified location. In some implementations, the selection is carried out using dilation starting from the identified location and continuing for a specific number of iterations or until reaching a neighboring identified location.

At operation 242, the identified candidate 3D vertices are mapped to points in a 2D Cartesian space. In some embodiments, local linear embedding is used to perform the mapping. For example, local linear embedding can be used to map the candidate 3D vertices identified at operation 240 to a 2D Cartesian space based on 3D distance between the 3D vertices. In some embodiments, the manifold space embedding is based on Hessian or Laplacian.

At operation 244, a shortest closed path is found. The shortest closed path may be a circular path or may have a different closed loop shape. In some embodiments, a polar transformation is performed on the mapped 2D points. For example, using the 2D projection of the identified location as the origin, a polar transformation is performed on the 2D projected candidate points. The resulting polar space is then divided by a grid. Each intersection point on the grid is assigned a curvature value, which can be determined by interpolation in 2D Cartesian space on the Delaunay triangulation of the vertices identified by operation 240 or determined by the curvature values of a predetermined number of nearest neighbor points in the 2D Cartesian space.

Then, a shortest path is found in the polar space such that the path is closed when the path is converted back to the Cartesian space. In some embodiments, dynamic programming is used to find the shortest path. In some embodiments, a branch and bound method is used to find the shortest path.

At operation 246, the vertices within the identified path are labeled as being part of the model of the tooth corresponding to the identified location.

At operation 248, the labels are refined globally. Although alternatives are possible, operation 248 is performed after each identified location has been processed by operation 238. In some embodiments, operation 248 is performed before all of the identified locations are processed by 238 but after a subset of adjacent identified locations are processed by operation 238.

Operation 248 refines the teeth globally in part because treating each tooth individually might result in conflicts. For example, some vertices may be labeled as being parts of two neighboring teeth. In some embodiments, the refinement of segmented teeth is treated as an optimization problem over a probabilistic graph. After segmentation, all points will be assigned with a label (either a specific tooth, which may be represented by the tooth number, or as gum tissue, which may be represented by the number 0). In some embodiments, seed point sets are defined as the region with a same label under certain number of times of erosion (for example 5 times). In some embodiments, erosion smooths the boundary of the mesh region labeled for a specific tooth. Any points in the seed point set will be fixed to the label previously assigned. For other points, the probability of assigning any label is the same. Then, in some embodiments, the final refined results are obtained by optimizing this problem using belief propagation or graph cuts.

Figure 5:
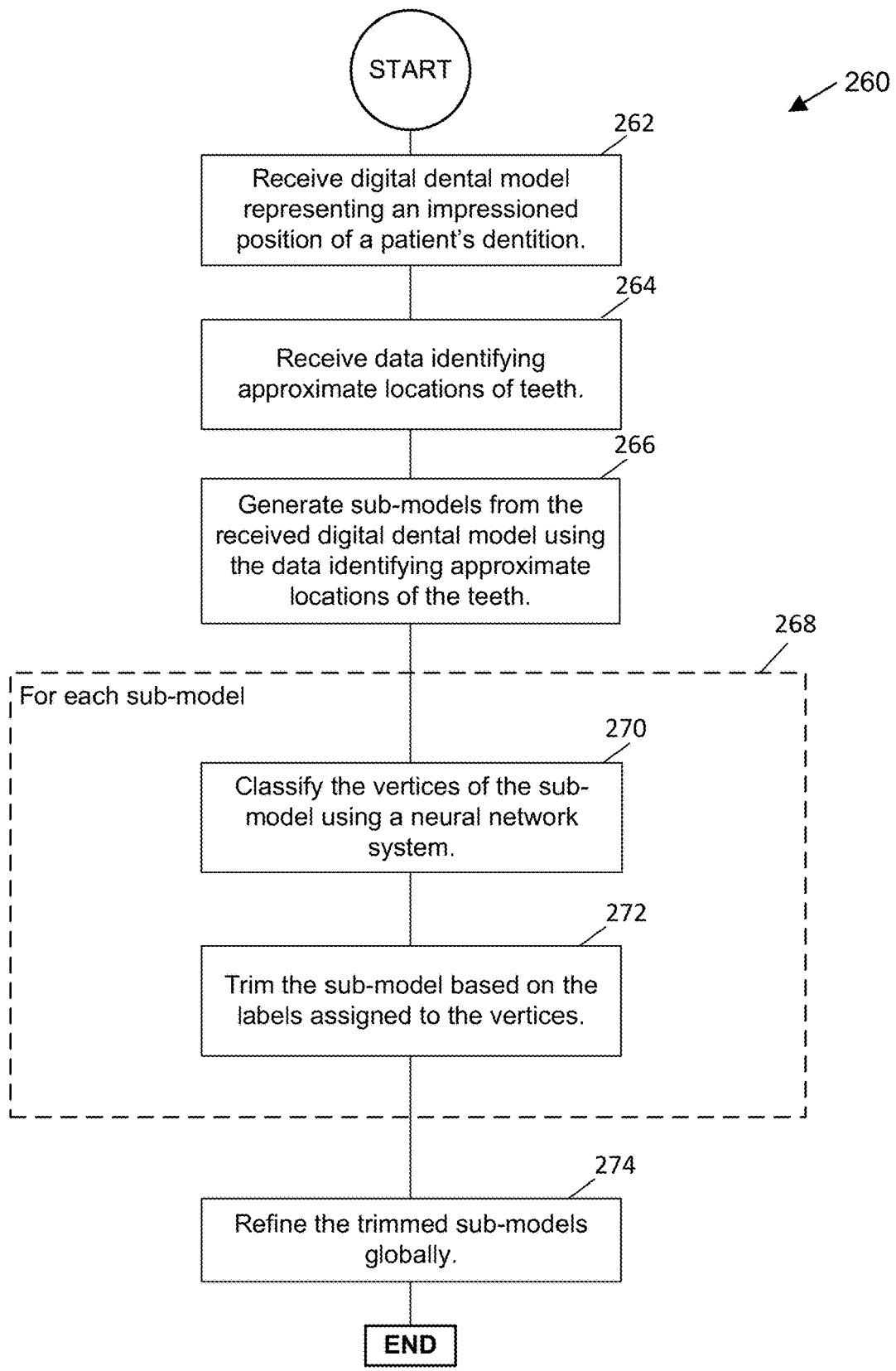
FIG. 5 is a schematic diagram of another method of segmenting a digital dental model performed by embodiments of the appliance design engine of FIG. 1.

FIG. 5 is a schematic diagram of a method 260 of segmenting a digital dental model. The method 260 is performed by embodiments of the appliance design engine 108. For example, the method 260 may be performed by the model segmentation engine 182.

At operation 262, a digital dental model representing an impressioned position of a patient's dentition is received. Operation 262 may be similar to operation 232, which has been previously described.

At operation 264, data identifying approximate locations of the patient's teeth are received. For example, the approximate locations of the patient's teeth may correspond to points on the surface of the digital dental model that are at or near the centers of the occlusal surface (or incisal edge) of some or all of the patient's teeth. In some implementations, receiving data identifying approximate locations of the patient's teeth may include generating a user interface that displays the digital dental model and receiving user inputs to identify the patient's teeth. In some implementations, receiving data identifying approximate locations of the patient's teeth includes using a neural network system to identify the approximate locations of the patient's teeth. Operation 264 may be similar to operation 234, which has been previously described.

At operation 266, sub-models are generated from the received digital dental model using the data identifying approximate locations of the teeth. In some implementations, a sub-model is generated for each of the identified approximate locations. For example, for each of the identified approximate locations, a region of the digital dental model surrounding the location may be selected as a sub-model. A sphere, ellipsoid, or cylinder may be used to select the region. The sphere may have a diameter equal to approximately 1.0-1.5 times an approximate tooth size (e.g., 10-15 millimeters). In some implementations, the diameter is adjusted based on the tooth type, which may be entered by a user or estimated based on the position of the identified approximate location. Some embodiments use an ellipsoid or cylindrical shapes that have a long axis oriented along the actual or approximate occlusal-gingival axis of the digital dental model. In some implementations, a cylinder of infinite height in the occlusal-gingival dimension is used to select regions for generating the sub-models. Beneficially, using a cylinder of infinite height simplifies the computation required to identify portions of the digital dental model as the vertices of the digital model can be projected onto a plane and then compared to a circle. In other words, using an infinite cylinder reduces the number of processing cycles required to select a region for a sub-model.

At operation 268, each of the sub-models is segmented into a model region corresponding to the tooth at the identified location. For example, the portion of the sub-model corresponding to the tooth at the identified location may be separated from the remainder of the sub-model. In some embodiments, the operation 268 is performed simultaneously for multiple of the sub-models (e.g., using separate processors or separate processor cores). In some embodiments, operation 268 is performed within a loop to sequentially perform the operation 268 on at least some of the sub-models.

In some embodiments, the operation 268 performs automatic tooth segmentation using a neural network system. Although alternatives are possible, in this example operation 268 includes operations 270 and 272, which are performed on each sub-model.

At operation 270, the vertices of a sub-model are classified using a neural network system. Classifying the vertices may include assigning labels to the vertices of the sub-model. In some implementations, the sub-model is converted to a point cloud by extracting the locations of vertices in the sub-model and disregarding connectivity between the vertices (i.e., the faces/edges are disregarded). In some implementations, the neural network system is a convolutional neural network that includes one or more convolutional layers. For example, the points of the point cloud may be provided as input to the neural network system. In some implementations, decimation or tessellation operations are performed on the sub-model to reduce or increase, respectively, the number of vertices in the sub-model to a specific number of vertices that the neural network system is expecting. Examples of neural network systems for segmenting 3D models that are used by some embodiments for segmenting the sub-models of the digital dental models is described in Qi, Charles R., et al. "PointNet: Deep learning on point sets for 3d classification and segmentation." *Proc. Computer Vision and Pattern Recognition (CVPR), IEEE* 1.2 (2017): 4, and Qi, Charles Ruizhongtai, et al. "Pointnet++: Deep hierarchical feature learning on point sets in a metric space." *Advances in Neural Information Processing Systems.* 2017, the entireties of which are incorporated herein. In some implementations, the neural network system is trained using a corpus of labeled digital dental models or sub-model. The vertices of the models in the corpus may, for example, be labeled as gingival tissue or teeth. In some implementations, the vertices of the sub-model are labeled as being either the center tooth (i.e., the tooth associated with the identified location), adjacent teeth, or gingival tissue.

At operation 272, the sub-model is trimmed based on the classification of the vertices. As noted above, in some implementations, the neural network classification is performed on a point cloud formed from the vertices of the sub-model, rather than the mesh associated with the sub-model. Labels generated during classification may be mapped back to the vertices of the sub-model.

In some implementations, the sub-model is then trimmed to remove any vertices that are not classified (or labeled) as being part of the center tooth. For example, the vertices that are classified as adjacent teeth or gingival tissue may be removed from the sub-model. In some implementations, the border of the remaining mesh may be smoothed to make a more uniform and smooth edge to the mesh.

At operation 274, the trimmed sub-models may be refined globally. For example, adjacent sub-models may be compared to resolve conflicts in which the same portion of a model is included in multiple models. Operation 274 may be performed similarly to operation 248, which has been previously described.

Although the method 230 is described above as generating sub-models (operation 266) and then segmenting the sub-models independently using a neural network (operation 268), in other embodiments the digital dental model is segmented directly using the neural network without first generating sub-models. For example, the neural network system may classify the vertices of the dental model as either tooth or gingival tissue. In some embodiments, the neural network may classify vertices within regions of the digital dental model as being part of a center tooth, adjacent teeth, or gingival tissue. The regions may be identified by sliding a 3D box along the dental arch of approximate tooth size.

Figure 6:
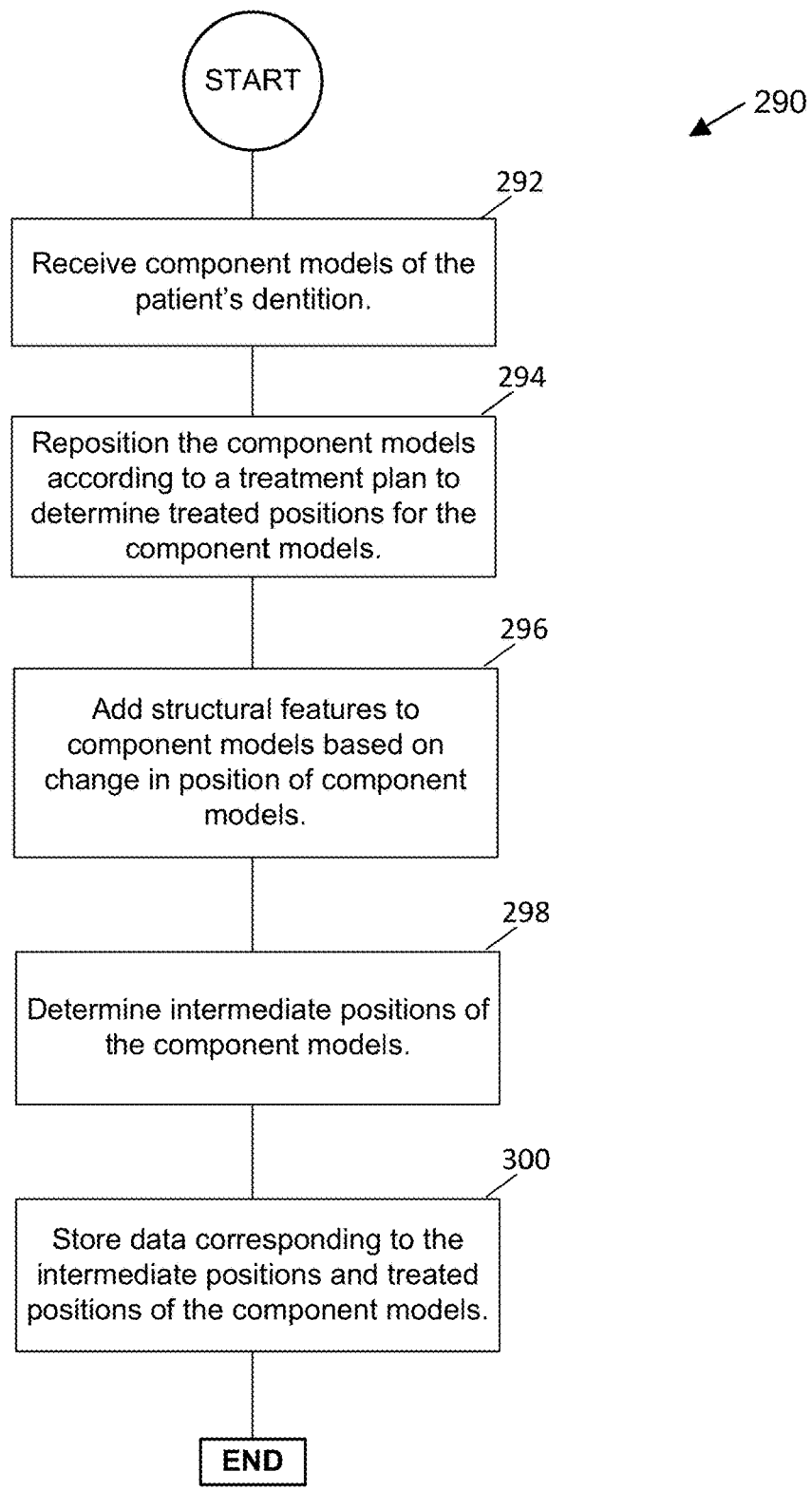
FIG. 6 is a schematic diagram of a method of generating a treatment plan performed by some embodiments of the system of FIG. 1.

FIG. 6 is a schematic diagram of a method 290 of generating a treatment plan. In some embodiments, the method 290 operates on component models generated by segmenting a digital dental model (e.g., the output of method 230). The method 290 is performed by embodiments of the appliance design engine 108. For example, the method 290 may be performed by the treatment planning engine 184.

At operation 292, the component models of the patient's dentition are received. The component models may be generated by the segmentation process described previously. For example, the component models may be generated by forming separate meshes for each of the vertices that are labeled for each tooth. In some embodiments, the component models are received from another computing device such a as a cloud server that performed the segmentation process. The component models can also be received from a database, file system, or elsewhere.

At operation 294, the component models are repositioned according to a treatment plan to determine the target treated positions for the component models. In some embodiments, the component models are repositioned based on inputs received via a user interface. In some embodiments, the component models are repositioned using a physics simulation engine. For example, the teeth may be modeled using an attractive force that causes their positions to move closer to one another. The models may also be treated as solid models that are unable to intersect (e.g., they bounce off each other when they collide). In some embodiments, the component models are repositioned using a model trained using a machine learning process. The machine learning process may train the model using a plurality of sets of input dental models and resulting target tooth models (e.g., aligned tooth models). Additionally, in some embodiments, scores are automatically generated for the aligned tooth models based on the alignment of the teeth. The alignment scores may also be provided by users in some implementations. Some embodiments use the scores in training the machine learning model. Additionally, some embodiments iteratively reposition the teeth to optimize the score. Additionally, some embodiments include rules related to permitted types of movement. An example method of repositioning the component models is illustrated and described further with respect to at least FIG. 7. For example, the machine learning model include a neural network.

At operation 296, structural elements are added to the component models based on the change in positions of component models from the impressioned positions to the target treatment position. An example structural element is a bonded attachment. The bonded attachment can come in various shapes such as a rectangular shape. The bonded attachment provides an additional structure on the tooth to which the interior of the dental appliance can be shaped to fit. In some embodiments, the amount of movement and type of movement (e.g., torque or extrusion) of the component models is compared to thresholds to determine whether bonded attachments should be added. Because the bonded attachments and other structural elements are added to the component models so that an appliance model built from the component models will fit to the added structural elements.

In some embodiments, a user interface is presented through which a user may confirm or adjust the locations of the added structural elements. If a bonded attachment is added to the component model, an indication will be presented to the user that a bonded attachment needs to be added to the corresponding tooth at a specific location. For example, in some embodiments, a dental appliance can be used as a bonding tray to guide the placement of the bonded attachments.

At operation 298, intermediate positions are determined for the component models. The intermediate positions correspond to movement stages between the initial position of the teeth as impressioned and the target tooth positions. In some embodiments, the intermediate positions are determined as key frames in the movement path. In some embodiments, the movement path is determined by interpolating between the target and initial position. Additionally, in some embodiments, the movement path is determined using techniques similar to those discussed with respect to repositioning the component models in operation 294. In some embodiments, the intermediate positions are determined based on movement thresholds for the teeth (e.g., the teeth are repositioned along the movement path until one of the teeth has been moved by the threshold amount).

At operation 300, data corresponding to the intermediate positions and treated positions of the component models is stored. In some embodiments, additional information about the treatment plan is stored such as information about the position and type of any structural elements that have been added.

Figure 7:
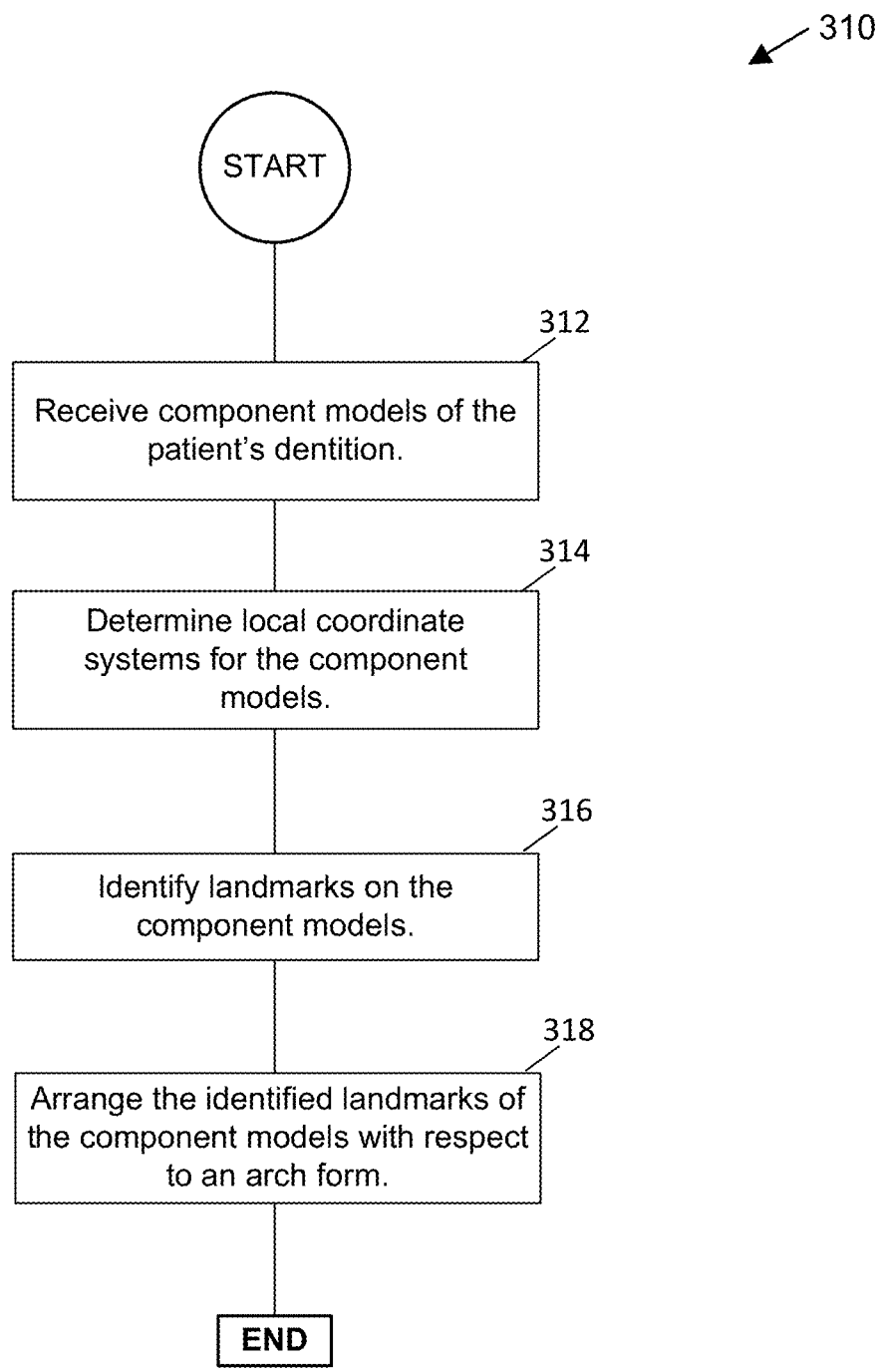
FIG. 7 is a schematic diagram of a method of generating a treatment plan performed by some embodiments of the system of FIG. 1.

FIG. 7 is a schematic diagram of a method 310 of generating a treatment plan. In some embodiments, the method 310 operates on component models generated by segmenting a digital dental model (e.g., the output of method 230) to determine a target post-treatment position. The method 310 is performed by embodiments of the appliance design engine 108. For example, the method 310 may be performed by the treatment planning engine 184. The method 310 is an example of one method to perform operation 294 of the method 290.

At operation 312, the component models of the patient's dentition are received. The operation 312 may be performed similarly to the operation 292, which has been described previously.

At operation 314, local coordinate systems are determined for the component models. For example, a local coordinate system may specify one or more of an occlusal-gingival axis, a mesial-distal axis, and a buccal/labial-lingual axis for the tooth associated with the component model. The local coordinate system may also define a known position within the component model. For example, the local coordinate system may specify an origin for a three axis coordinate system for a specific component model.

In some implementations, the local coordinate system may be determined by fitting the component model to a sample tooth model for which the local coordinate system is known. Fitting the model may include rotating, scaling, and repositioning the sample tooth model to reduce the distance between points on the surface of the component mode and points of the sample tooth model. Then, the same rotation, scaling, and repositioning may be applied to the local coordinate system of the sample tooth model to determine the local coordinate system of the component model. Different sample tooth models may be used for different types of teeth.

In some implementations, the local coordinate system is determined after landmarks are identified (operation 316). The positions of the landmarks may then be used to determine the coordinate system. For example, the relationship between the positions of adjacent cusp tips may be used to determine the mesial-distal axis of the teeth. As another example, the orientation of a groove on the teeth may be used to determine the mesial-distal axis. Similar techniques may be used to determine other axes of the local coordinate system.

At operation 316, landmarks are identified on the component models. The landmarks may be identified using a machine learning model, such as a neural network system. For example, the neural network system may be trained using a corpus of training component models in which at least some of the vertices are labeled as being landmarks. The labels associated with the vertices may also indicate the type of landmark. The neural network system may then classify vertices of the component models. In some implementations, the neural network system assigns weights to the vertices that correspond to the likelihood that the vertex is part of a specific landmark.

At operation 318, the identified landmarks of the component model are arranged with respect to an arch form. In some implementations, the component models may be repositioned so the landmarks are aligned along the arch form. For example, the grooves may be positioned along the arch form or positioned in a specific relationship to the arch form. Additionally, the component models may be oriented in a specific relationship to the arch form (e.g., the component models may be tipped to orient the occlusal-gingival axis in a specific manner with respect to the arch form, the component models may be rotated to orient the mesial-distal axis in a specific manner with respect to the arch form). In some implementations, the arch form is generated from the digital dental model. The arch form may also be generated from a library of one or more target arch forms. In some implementations, a user interface is generated to allow the user to adjust the arch form. Additionally, in some embodiments, the arch form is generated by a machine learning model, such as a neural network system that is trained using a corpus of training dental models that include pre-treatment positions. For example, the neural network system may be trained to learn a mapping from the model of the pre-treatment dentition to a target arch form. In some implementations, the neural network system is trained to generate target teeth positions and orientations without expressly generating an arch form. For example, the neural network system may optimize a tooth alignment score. The neural network (and in some cases the score) may consider the alignment of adjacent teeth and the interaction between teeth on opposite arches (e.g., so that cusps of teeth on one arch fit the grooves of teeth on the other arch).

Figure 8:
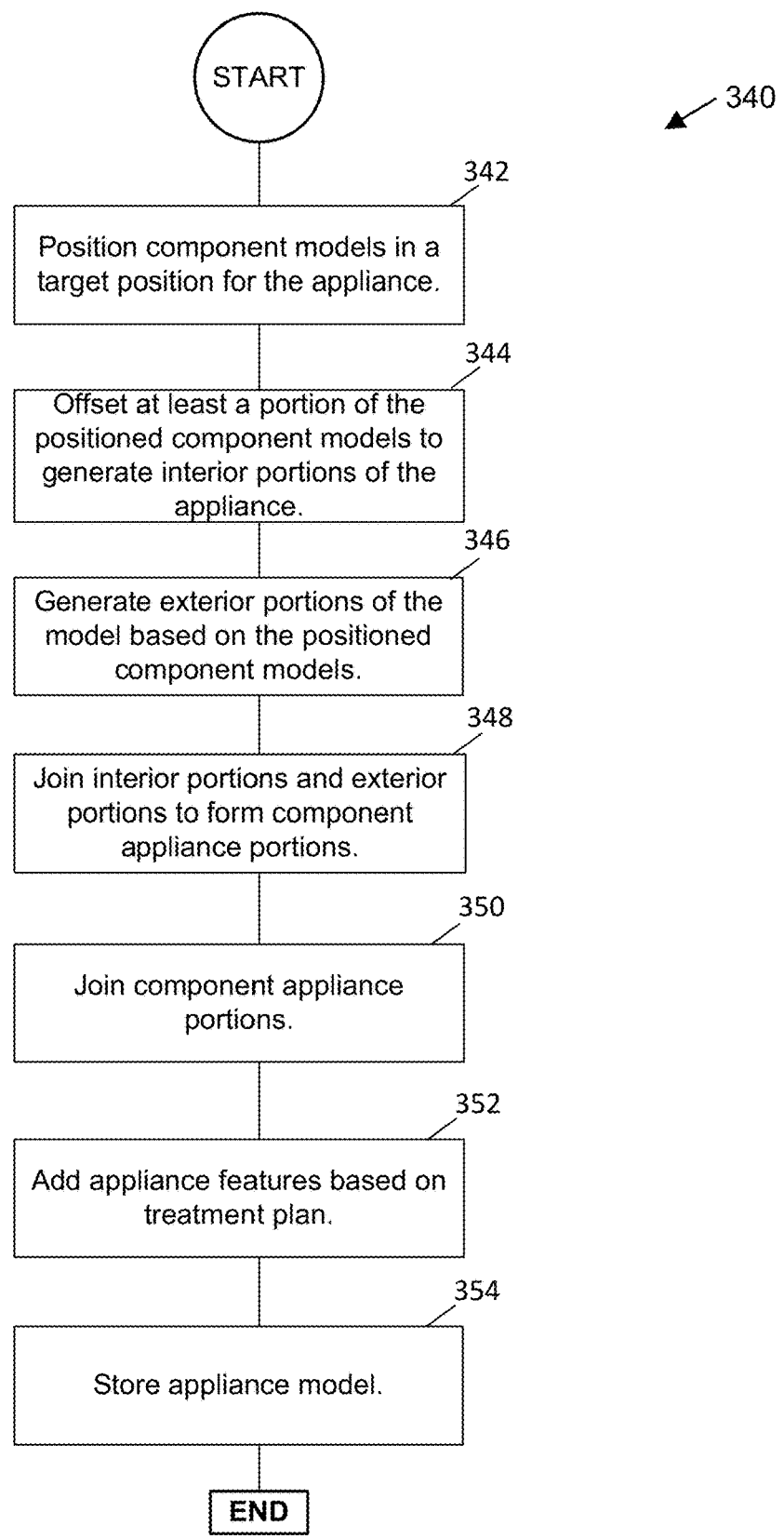
FIG. 8 is a schematic diagram of a method of generating an appliance model performed by some embodiments of the system of FIG. 1.

FIG. 8 is a schematic diagram of a method 340 of generating an appliance model. In some embodiments, the method 340 generates an appliance model based on component models positioned according to either one of the intermediate positions or the target treated position. The method 340 is performed by embodiments of the appliance design engine 108. For example, the method 340 may be performed by the appliance model generation engine 186.

At operation 342, component models are positioned in a target position for the appliance. For example, the target position may be any of the intermediate positions determined by the method 290 or the target treatment position determined by the method 290. Repositioning the component models may include changing one or both of the locations of the component models and the orientations of the component models.

At operation 344, at least a portion of the positioned component models are offset to generate interior portions of the appliance model. For example, an interior offset of between 0.1 mm and 0.5 mm can be applied to the positioned component models to generate the interior surfaces. As described above, in some embodiments, the component models include additional structural elements such as bonded attachment. In these embodiments, the interior portion is also offset over the additional structural elements.

At operation 346, exterior portions of the appliance model are generated based on the positioned component models. In some embodiments, the exterior portions are generated by offsetting the component models by an exterior offset amount that is greater than the interior offset amount (e.g., 0.1-0.5 mm). In some embodiments, the interior surfaces are offset by a desired thickness of the appliance. The thickness may be determined via a default value, a user input, or based on properties of the treatment plan (e.g., how much the tooth is being moved).

At operation 348, the interior portions and exterior portions are joined to form component appliance portions. In some embodiments, the interior surface and the exterior surface are joined by forming facets connecting the edges of the surfaces. In some embodiments, the edges of one or both of the interior surface and the exterior surface are smoothed before being joined. In this manner, the aesthetics and comfort to the wearer of the resulting appliance may be enhanced.

At operation 350, the component appliance portions are joined. In some embodiments, the component models are joined by generating connecting structures between adjacent appliance portions. For example, the connecting structures can include loop structures. Another example of a connecting structure is a mesh or lattice. The connecting structure can also include apertures or tubes through which a connecting wire or tab can be placed. In some embodiments, the component appliance portions are joined at least in part using a union of the individual component appliance portions. In some embodiments, not all of the component appliance portions are joined as a connected model. For example, if a gap between adjacent component models exceeds a predetermined threshold (e.g., due to a missing tooth), the component appliance portions may be joined into multiple disjoint appliance models on sides of the gap. As described further below, a tab and slot arrangement may be added to the separate appliance models to facilitate closing the gap.

At operation 352, appliance features are added to the appliance based on the treatment plan. For example, some embodiments include a tab and slot arrangement to facilitate closing a gap between teeth. A model of a tab may be added to a part of an appliance model and a slot may be added to a separate part of the appliance model. The shape and positioning of the tab and slot may be determined as part of the treatment plan based on the desired tooth movement.

Another example of appliance features include patterned regions which may allow for additional flexibility in one or more directions. The patterned regions may be added based on the desired type of tooth movement. Another example of appliance features are receiving structures for bonded attachments or other structural elements added to the component models. For example, a pre-defined structure or parametrically defined structure may be joined to the appliance to interact with a bonded attachment. This added structure may fit the bonded attachment more precisely than an interior surface generated using an offset. In addition, to an added structure, some embodiments include an aperture or recess configured to receive the bonded attachment. Some embodiments do not include any additional appliance features and in some embodiments additional appliance features are not included in all appliances.

At operation 354, the appliance model is stored. In some embodiments, multiple models are generated and stored for some or all of the intermediate positions and target treatment positions of the patient's teeth. The appliance models may be stored locally or transmitted to a server for storage.

Figure 9:
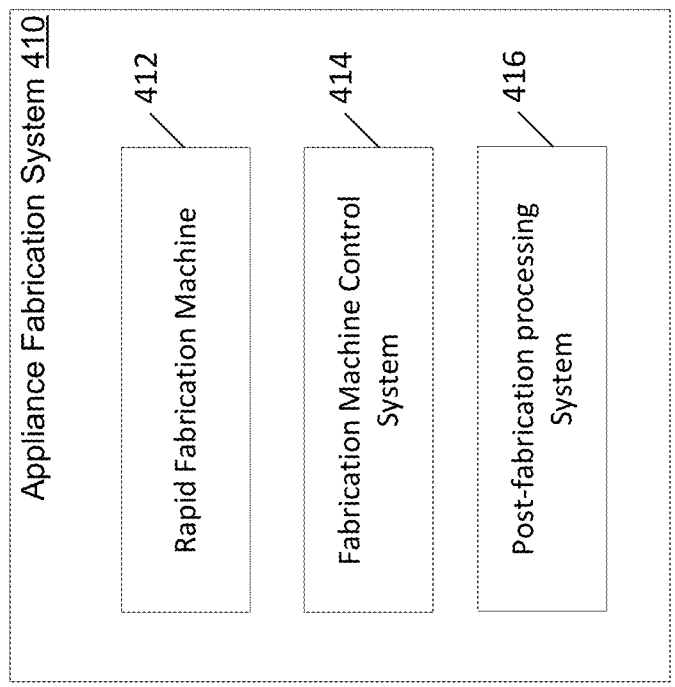
FIG. 9 is a schematic diagram of an example embodiment of the appliance fabrication system of FIG. 1.

FIG. 9 is a schematic diagram of an example appliance fabrication system 410. The appliance fabrication system 410 is an example of the appliance fabrication system 112. In this example, the appliance fabrication system 410 includes a rapid fabrication machine 412, a fabrication machine control system 414, and a post-fabrication processing system 416. Although shown as separate components in this figure, in some embodiments, the fabrication machine control system 414 is a component of the rapid fabrication machine 412.

As described above, the rapid fabrication machine 412 produces three dimensional physical parts based on computer-generated models. Examples of the rapid fabrication machine 412 include, but are not limited to, 3D printers, stereolithography equipment, digital light processing (DLP) rapid prototyping systems, and computer numerically controlled (CNC) milling devices.

The fabrication machine control system 414 controls the operation of the rapid fabrication machine 412 to generate a physical part based on a received computer model. In some embodiments, the fabrication machine control system 414 converts a received computer model to a series of instructions for the fabrication machine 412.

The post-fabrication processing system 416 processes parts produced by the rapid fabrication machine 412. For example, the post-fabrication processing system 416 may include a post-cure UV oven that is used to treat parts that are fabricated in at least some embodiments.

Figure 10:
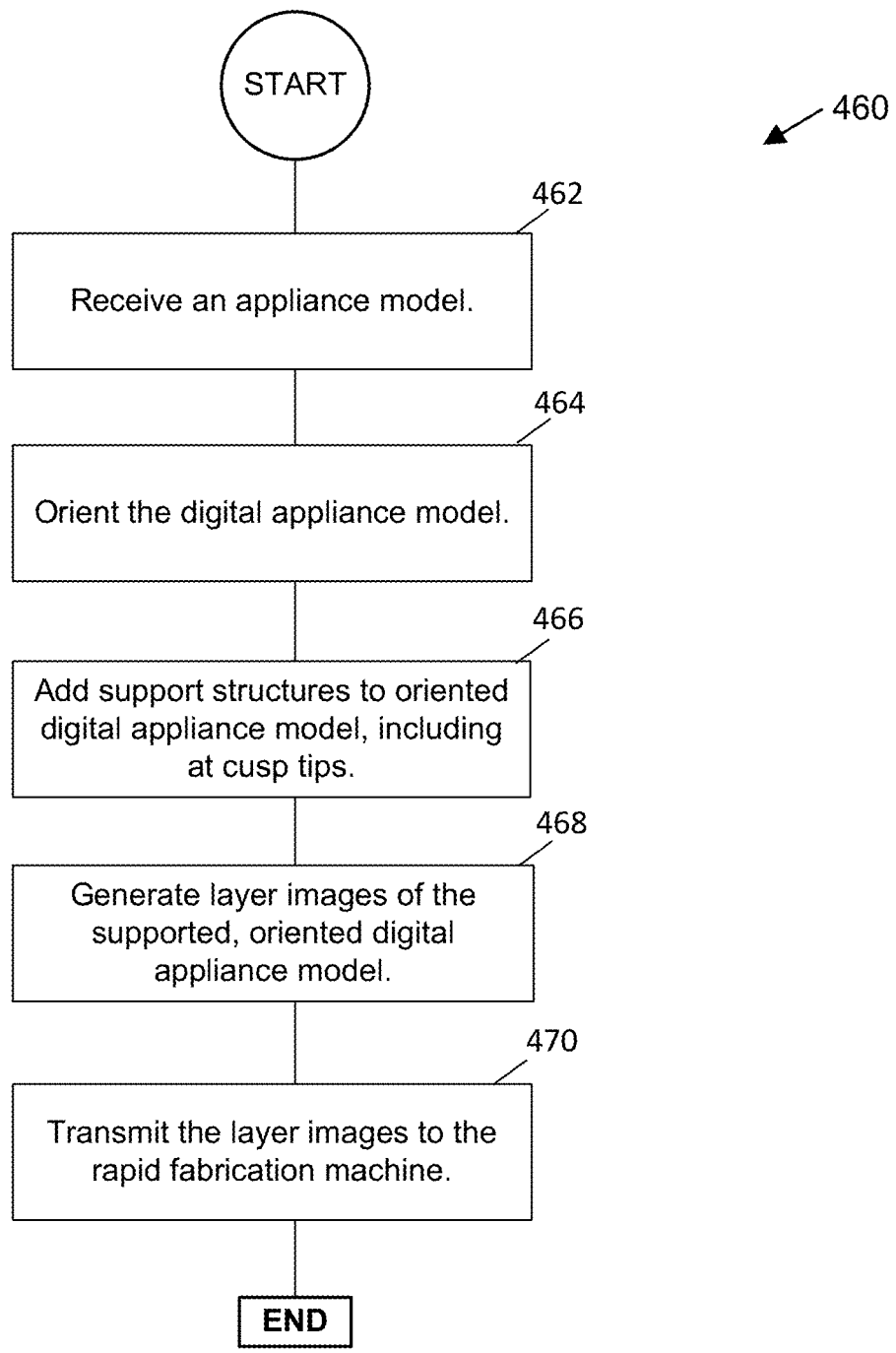
FIG. 10 is a schematic diagram of a method of controlling the fabrication of an appliance model performed by embodiments of the appliance fabrication system of FIG. 9.

FIG. 10 is a schematic diagram of a method 460 of controlling the fabrication of an appliance model. The method 460 is performed by embodiments of the fabrication machine control system 414.

At operation 462, an appliance model is received. For example, the appliance model may be received from the appliance design system 106.

At operation 464, the appliance model is oriented for fabrication. In some embodiments, the appliance model is oriented to minimize its height during fabrication. For example, the appliance model may be oriented so that the occlusal surface of the model is approximately horizontal. In some embodiments, the appliance model is oriented so that the interior surface faces up.

At operation 466, support structures are added to the appliance model. The support structures may be added to provide support during the fabrication process. In some embodiments, the support structures are added at or near the location of cusp tips in the appliance model. In some embodiments, the support structures are added at locations corresponding to other structural elements of the appliance. Some embodiments also determine the location of support structures based on analyzing geometric properties of the appliance model.

At operation 468, layer images are generated for the supported, oriented appliance model. In some embodiments, the layer images are cross-sections of the appliance model that are generated by intersecting a horizontal plane with the appliance model at intervals corresponding to a layer depth that will be used in the fabrication. In some embodiments, the images are black and white. The portions of the cross-section that are within the appliance model are colored a first color (e.g., white) and the portions outside of the model are colored a second color (e.g., black). Some embodiments generate images using additional or different colors (e.g., to indicate support parts which may be fabricated using a different material).

At operation 470, the layer images are transmitted to the rapid fabrication machine for fabrication. The layer images may be transmitted sequentially or in a group to the rapid fabrication machine. In some embodiments, additional instructions are transmitted to the rapid fabrication machine 412 with the images.

Figure 11:
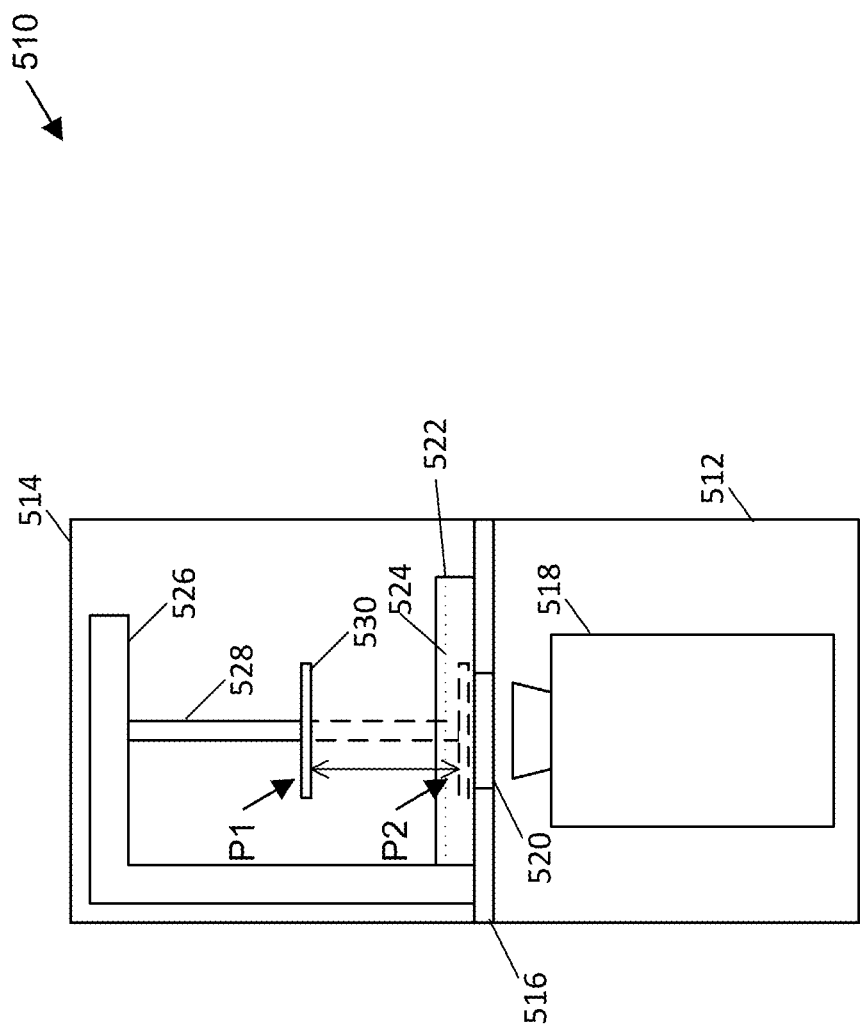
FIG. 11 is a schematic cross-sectional diagram of an example embodiment of the rapid fabrication machine of FIG. 9.

FIG. 11 is a schematic cross-sectional diagram of an example rapid fabrication machine 510. The rapid fabrication machine 510 is an example of the rapid fabrication machine 412. In this example, the rapid fabrication machine 510 includes a lower housing 512 and an upper shielding structure 514 that are separated by a horizontal surface 516. The rapid fabrication machine 510 also includes a projector 518 disposed within the lower housing 512 and oriented to project images through a window 520 in the surface 516. In some embodiments, the projector 518 is a digital light projector that emits ultraviolet light. The window 520 may be formed from a transparent plastic material that allows the ultraviolet light emitted by the projector to pass. The upper shielding structure 514 may be formed from a plastic material that prevents passage of some or all of the ultraviolet light.

The rapid fabrication machine 510 also includes a reservoir 522 disposed above the window 520 and configured to contain a liquid build material 524. The rapid fabrication machine 510 also includes a support structure 526 that has movable arm 528 that raises and lowers a build surface 530. For example, the movable arm 528 may move the build surface from an upper position P1 to a lower position P2.

During operation, the rapid fabrication machine 510 will repeatedly cause the movable arm 528 to move up and down within the liquid build material 524. For example, the build arm may move to a position in the liquid build material 524, leaving a thin layer of the liquid build material 524 below the build surface 530. An image is then projected by the projector 518 through the window 520. The ultraviolet light emitted by the projector 518 causes the thin layer of build material to cure into a solid that is attached to the build surface 530. The movable arm 528 then moves up, causing the build surface 530 to move away from the window 520 so that the cured solid separates from the surface of the window 520. Thereafter, the process is repeated with the movable arm 528 lowering the build surface 530 so as to leave a thin layer of the liquid build material 524 below the cured solid that is attached to the build surface 530. A new image can then be projected to add another layer to the cured solid. In some embodiments, during successive iterations, the movable arm 528 positions the build surface 530 at progressively higher positions during the lowering phase. These progressively higher positions may be offset by a layer thickness such as 50 or 100 microns. In at least some embodiment, there are no additional movements or motions (tipping or sliding) of the build surface 530 beside the raising and lowering. Beneficially, this build process is simpler and requires less mechanical components than build processes that require tilting of the build platform. In comparison to build processes that require tipping, sliding, or other additional movements to separate the solid part from the window 520, the process described herein may build a part more rapidly due to having fewer movements in the build process. In some embodiments, the aligner models are positioned or designed so as to allow separation from the window 520 with only up-and-down movements (i.e., in contrast to parts that require tilt or slide motions to separate from the build window).

Figure 12:
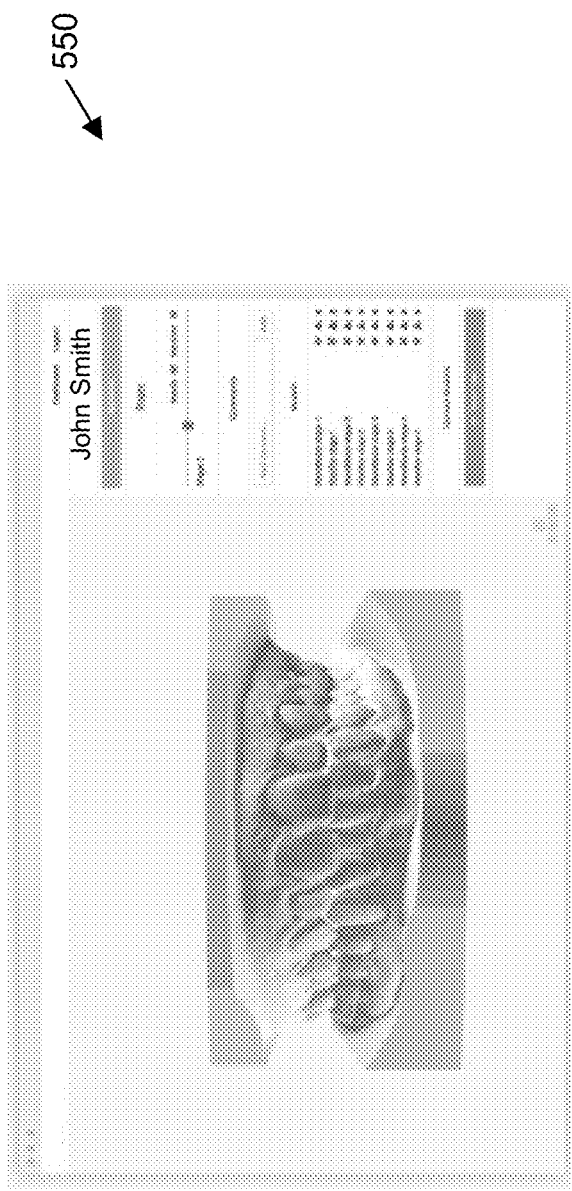
FIG. 12 shows an example user interface screen generated by some embodiments of the user interface engine of FIG. 3.

FIG. 12 shows an example user interface screen 550 generated by some embodiments of the user interface engine 188. In this example, a digital dental model is shown, such as the digital dental model 104. Additionally, the interface includes various information about the patient associated with the digital dental model and controls for interacting with and planning a treatment for the patient.

Figure 13:
FIG. 13 shows an example user interface screen generated by some embodiments of the user interface engine of FIG. 3.

FIG. 13 shows an example user interface screen 590 generated by some embodiments of the user interface engine 188. In this example, a digital dental model is shown, such as the digital dental model 104. In this example, the model is split to show an occlusal view of both the upper and lower arch. Additionally, the interface includes tools for identifying the approximate location of teeth on the arch. These tools may be used in segmenting the digital dental model. For example, a user may be able to position the yellow spheres over each of the teeth by clicking, pointing, dragging, or other inputs.

Figure 14:
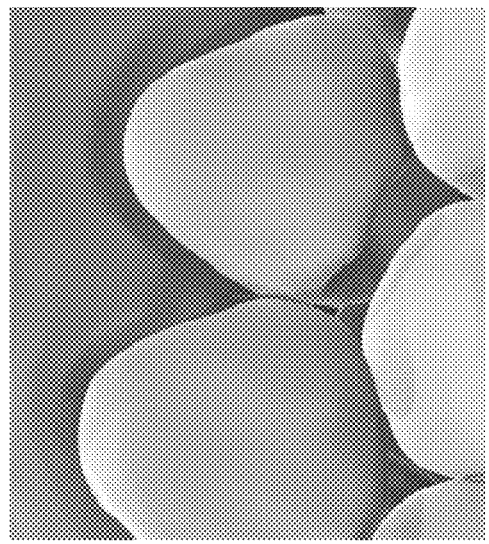
FIG. 14 shows an example user interface screen generated by some embodiments of the user interface engine of FIG. 3.

FIG. 14 shows an example user interface screen 630 generated by some embodiments of the user interface engine 188. In this example, multiple component models generated from a digital dental model are shown. In this example, the component models correspond to teeth segmented out of the digital dental model and the remainder of the digital dental model is shown as gum tissue. In this example, indicators (e.g., red lines) are shown in the interproximal regions to indicate where the model was segmented. In some embodiments, the user interface includes various tools to modify the segmentation of the model.

Figure 15B:
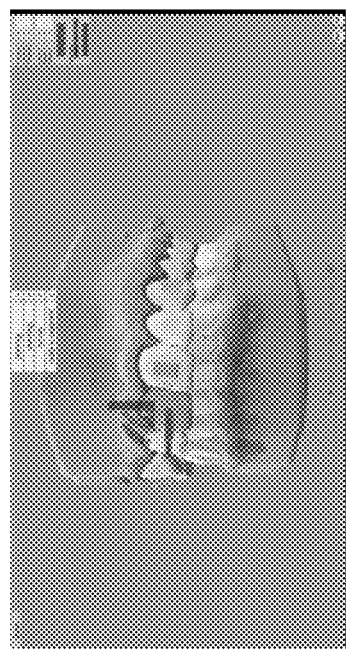
FIG. 15B shows an example user interface screen generated by some embodiments of the user interface engine of FIG. 3.
Figure 15A:
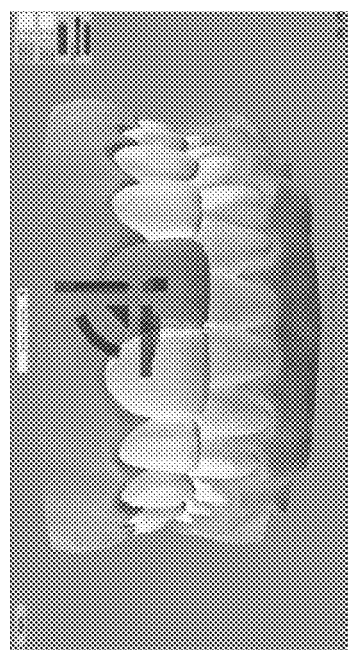
FIG. 15A shows an example user interface screen generated by some embodiments of the user interface engine of FIG. 3.

FIG. 15A shows an example user interface screen 670 and FIG. 15B shows an example user interface screen 710 generated by some embodiments of the user interface engine 188. In this example, a segmented model is shown and tools are provided for planning a treatment. In this example, interface tools are shown that can be used to change the locations and orientations of the component models associated with the patient's upper central incisors. FIG. 15A shows the tools with respect to the upper left central incisor and FIG. 15B shows the tools with respect to the upper right central incisor.

Figure 16:
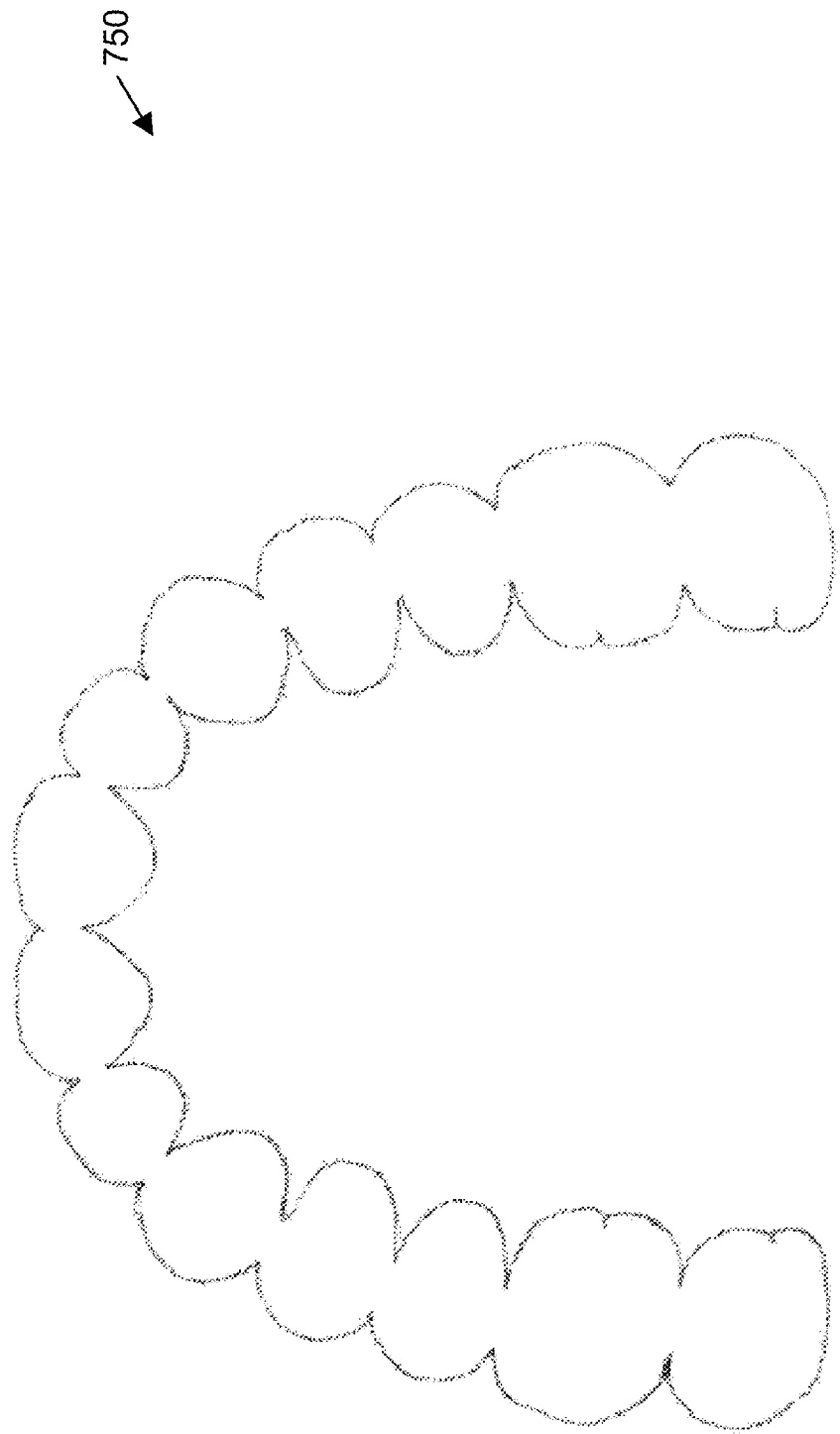
FIG. 16 is a schematic diagram of an example of a dental appliance that may be fabricated by embodiments of the system of FIG. 1.

FIG. 16 is a schematic example of a dental appliance 750 that may be fabricated by embodiments of the system 100. In this example, the dental appliance 750 is an orthodontic aligner. In some embodiments, the dental appliance 750 includes a thin shell that is shaped to fit over the patient's dentition.

Figure 17:
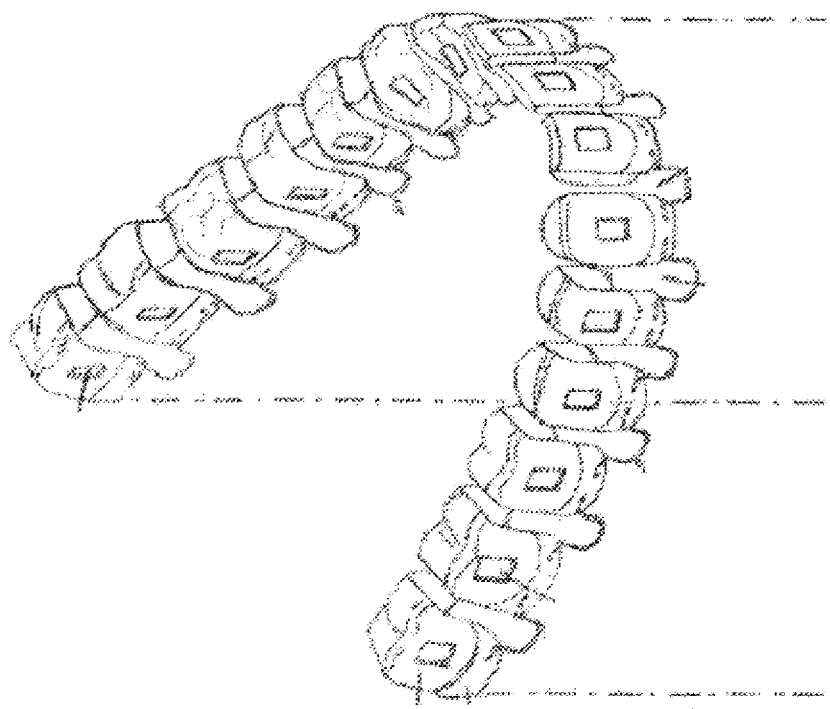
FIG. 17 is a schematic diagram of an example of a dental appliance that may be fabricated by embodiments of the system of FIG. 1.

FIG. 17 is a schematic example of a dental appliance 790 that may be fabricated by embodiments of the system 100. In this example, the dental appliance 790 is an orthodontic aligner that has separate thin shell portions that are connected by loops. In some embodiments, the loops are biased away from the patient's gum tissue. In some embodiments, the amount of bias is determined based on the nature of the movement urged by the appliance (e.g., if a tooth is being torqued, the loop may be biased further away from the gum tissue to avoid painfully impinging on the tissue). The thin shell portions also include apertures to fit over bonded attachments. In some implementations, portions of a digital dental model labeled as gingival tissue are offset or otherwise expanded. This offset can guide the biasing of the loops away from the patient's gum tissue. The appliance design can then be adjusted to fit the expanded gingival tissue. In some implementations, a physical model is fabricated based on the digital dental model with the expanded gingival tissue. The dental appliance can then be formed using the physical model and the previously-described suck down process.

Figure 18:
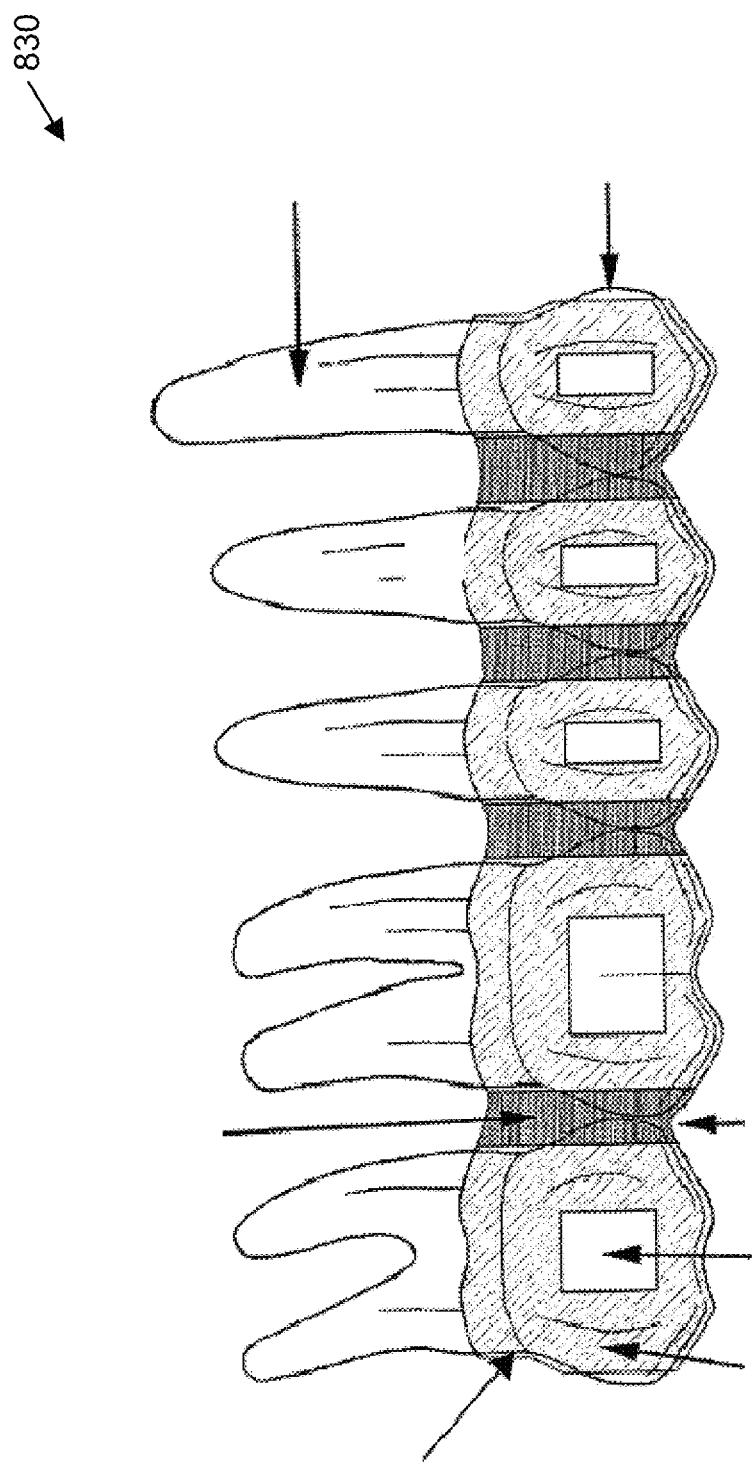
FIG. 18 is a schematic diagram of an example of a dental appliance that may be fabricated by embodiments of the system of FIG. 1.

FIG. 18 is a schematic example of a dental appliance 830 that may be fabricated by embodiments of the system 100. In this example, the dental appliance 830 is an orthodontic aligner that includes solid thin shell portions and patterned thin shell portions. The patterned thin shell portions are shown with darker shading and may allow for greater flexibility in one or more directions.

Figure 19:
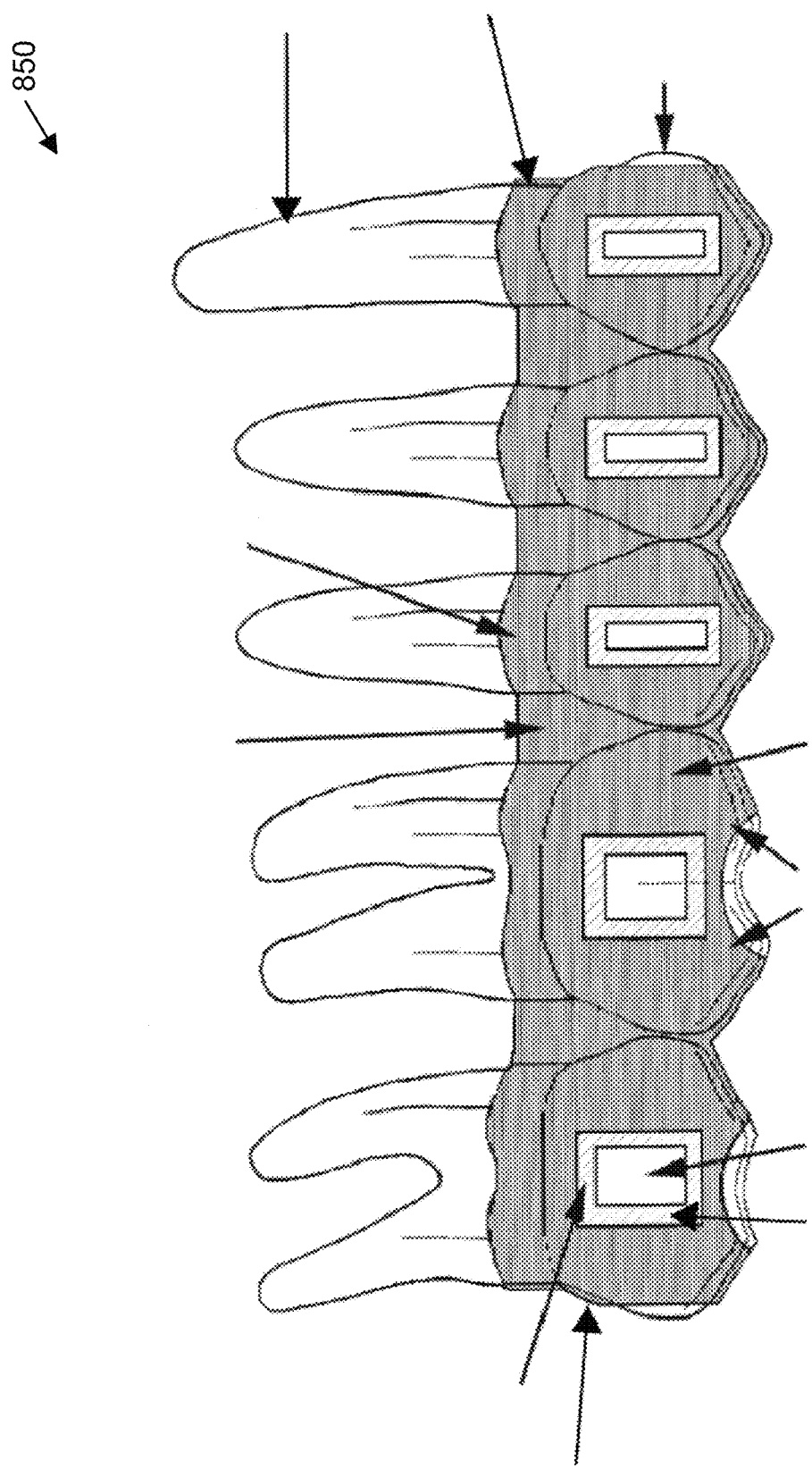
FIG. 19 is a schematic diagram of an example of a dental appliance that may be fabricated by embodiments of the system of FIG. 1.

FIG. 19 is a schematic example of a dental appliance 850 that may be fabricated by embodiments of the system 100. In this example, the dental appliance 850 is an orthodontic aligner that is formed from a flexible region that is configured to provide flexibility in at least one dimension. For example, the flexible region may be configured to elongate to deliver a continuous force to the patient's teeth. The continuous force may increase in proportion to the amount of elongation induced in the flexible region when the dental appliance 850 is worn by a patient. For example, the dental appliance 850 may apply a spring-like for to the patient's teeth (e.g., like a spring, the force applied by the dental appliance 850 increases as it is stretched further). In some implementations, the dental appliance 850 is configured to have different amounts of flex (or capability to elongate) in different regions or directions based on the structure of the dental appliance 850 in those regions. For example, the dental appliance 850 may include topographical features or other structural variations that increase flexibility in specific regions or directions. The topographic features may include 3D lattices, holes, variations in material thickness, fold lines, and other structural variations.

Figure 20B:
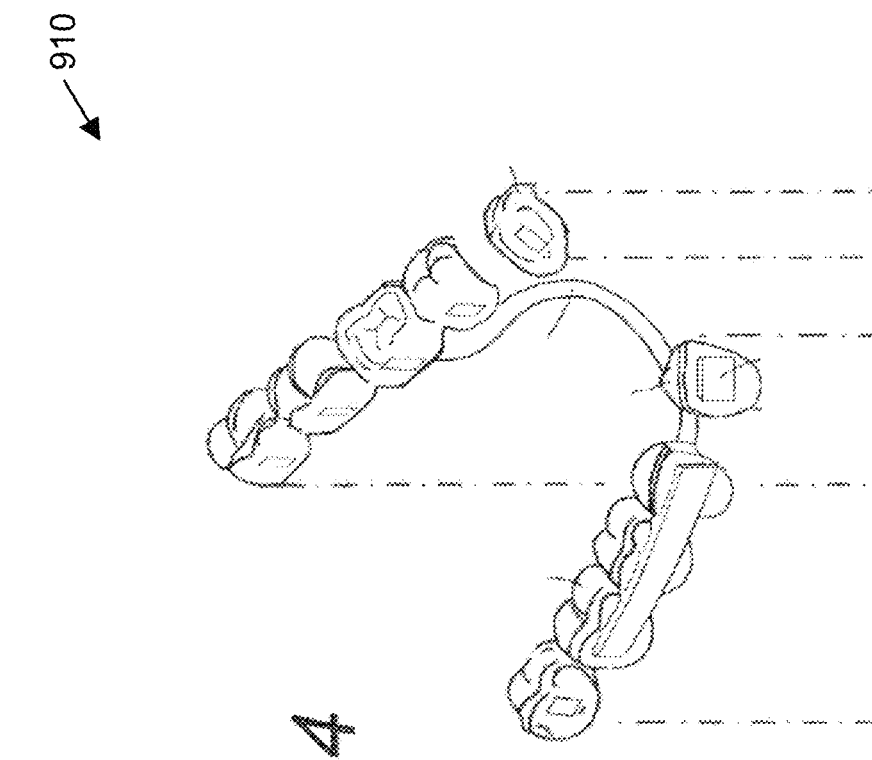
FIG. 20B is a schematic diagram of an example of a dental appliance component that may be fabricated by embodiments of the system of FIG. 1.
Figure 20A:
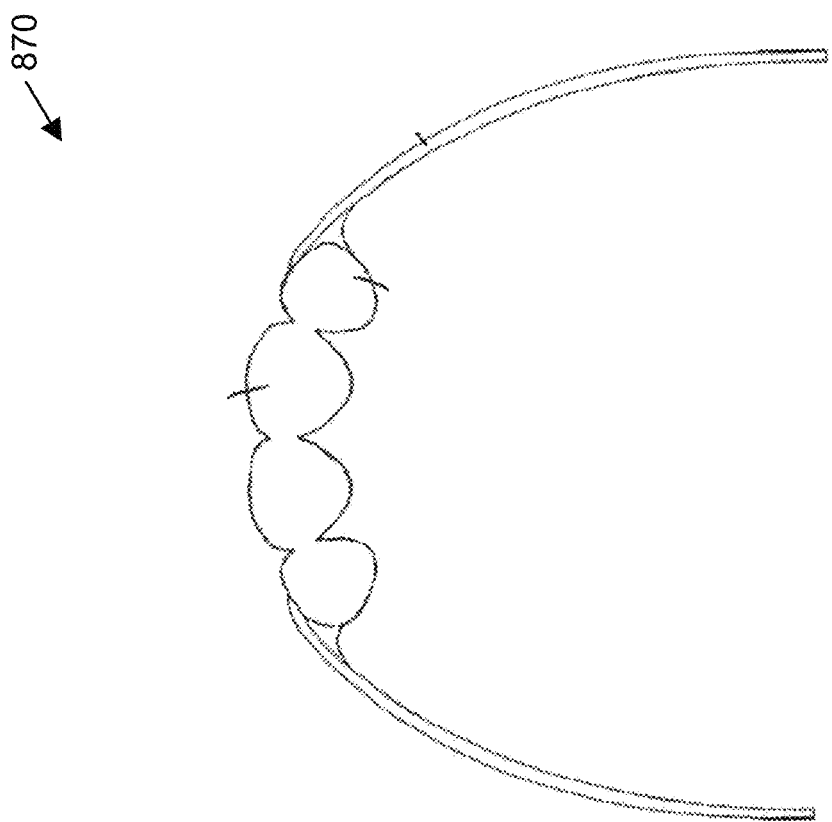
FIG. 20A is a schematic diagram of an example of a dental appliance component that may be fabricated by embodiments of the system of FIG. 1.

FIG. 20A is a schematic example of a dental appliance component 870 that may be fabricated by embodiments of the system 100. FIG. 20B is a schematic example of a dental appliance component 910 that may be fabricated by embodiments of the system 100. In this example, the dental appliance component 870 includes tabs that extend in the posterior direction and are configured to mate with slots of the dental appliance component 910. This tab-and-slot arrangement can be used to close gaps in the patient's dentition.

Figure 21:
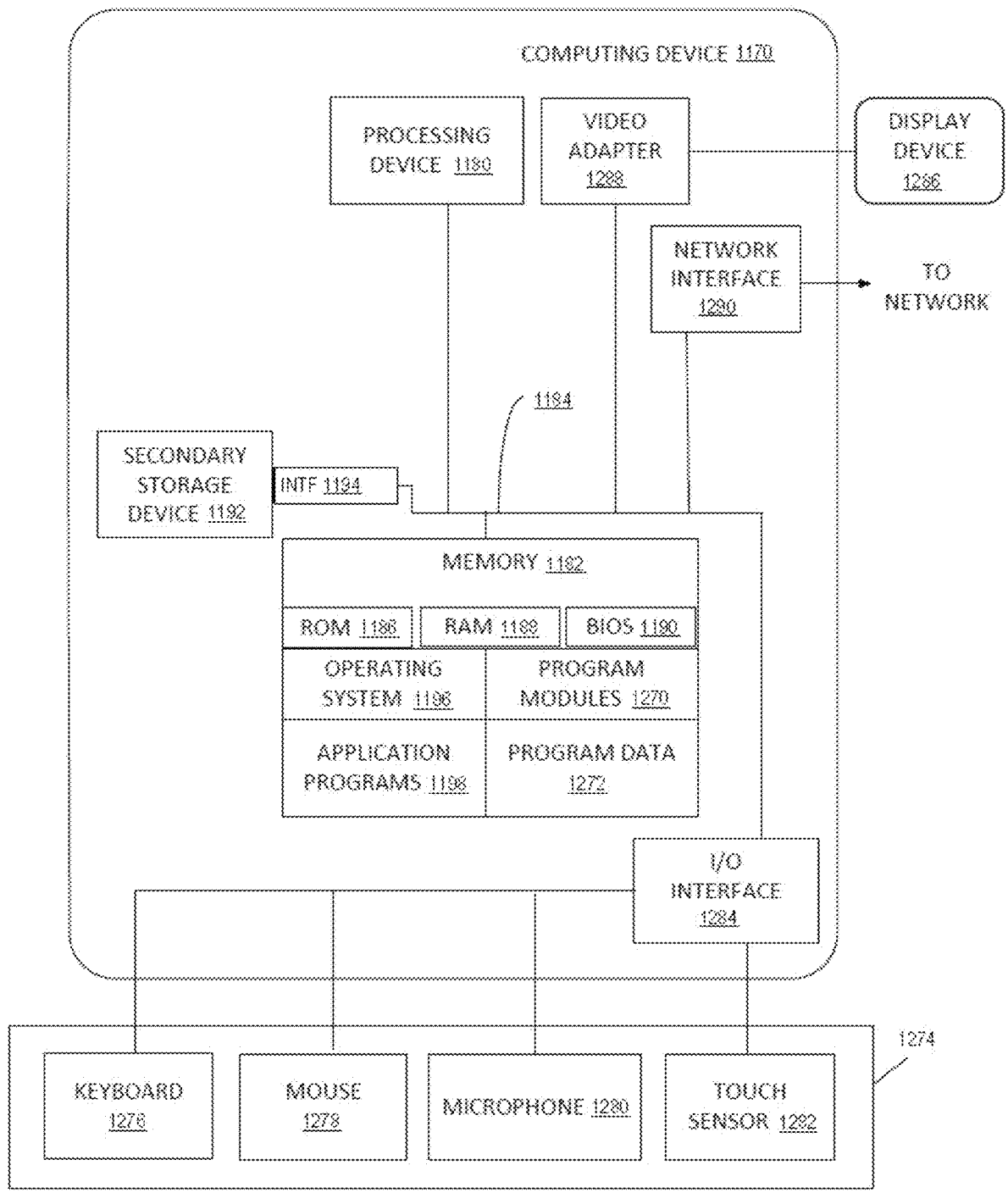
FIG. 21 shows an example of a computer device that can be used to implement the techniques described here.

FIG. 21 illustrates an example architecture of a computing device 1170 that can be used to implement aspects of the present disclosure, including any of the plurality of computing devices described herein, such as a computing device of the impression system 102, appliance design system 106, appliance fabrication system 112, or any other computing devices that may be utilized in the various possible embodiments.

The computing device illustrated in FIG. 21 can be used to execute the operating system, application programs, and software modules (including the software engines) described herein.

The computing device 1170 includes, in some embodiments, at least one processing device 1180, such as a central processing unit (CPU). A variety of processing devices are available from a variety of manufacturers, for example, Intel or Advanced Micro Devices. In this example, the computing device 1170 also includes a system memory 1182, and a system bus 1184 that couples various system components including the system memory 1182 to the processing device 1180. The system bus 1184 is one of any number of types of bus structures including a memory bus, or memory controller; a peripheral bus; and a local bus using any of a variety of bus architectures.

Examples of computing devices suitable for the computing device 1170 include a desktop computer, a laptop computer, a tablet computer, a mobile computing device (such as a smartphone, an iPod® or iPad® mobile digital device, or other mobile devices), or other devices configured to process digital instructions.

The system memory 1182 includes read only memory 1186 and random access memory 1188. A basic input/output system 1190 containing the basic routines that act to transfer information within computing device 1170, such as during start up, is typically stored in the read only memory 1186.

The computing device 1170 also includes a secondary storage device 1192 in some embodiments, such as a hard disk drive, for storing digital data. The secondary storage device 1192 is connected to the system bus 1184 by a secondary storage interface 1194. The secondary storage devices 1192 and their associated computer readable media provide nonvolatile storage of computer readable instructions (including application programs and program modules), data structures, and other data for the computing device 1170.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1192 or system memory 1182, including an operating system 1196, one or more application programs 1198, other program modules 1270 (such as the software engines described herein), and program data 1272. The computing device 1170 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1170 through one or more input devices 1274. Examples of input devices 1274 include a keyboard 1276, mouse 1278, microphone 1280, and touch sensor 1282 (such as a touchpad or touch-sensitive display). Other embodiments include other input devices 1274. The input devices are often connected to the processing device 1180 through an input/output interface 1284 that is coupled to the system bus 1184. These input devices 1274 can be connected by any number of input/output interfaces, such as a parallel port, serial port, game port, or a universal serial bus. Wireless communication between input devices and the interface 1284 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 1286, such as a monitor, liquid crystal display device, projector, or touch-sensitive display device, is also connected to the system bus 1184 via an interface, such as a video adapter 1288. In addition to the display device 1286, the computing device 1170 can include various other peripheral devices (not shown), such as speakers or a printer.

When used in a local area networking environment or a wide area networking environment (such as the Internet), the computing device 1170 is typically connected to the network through a network interface 1290, such as an Ethernet interface. Other possible embodiments use other communication devices. For example, some embodiments of the computing device 1170 include a modem for communicating across the network.

The computing device 1170 typically includes at least some form of computer readable media. Computer readable media includes any available media that can be accessed by the computing device 1170. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1170.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 21 is also an example of programmable electronics, which may include one or more such computing devices, and when multiple computing devices are included, such computing devices can be coupled together with a suitable data communication network so as to collectively perform the various functions, methods, or operations disclosed herein.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method comprising:
receiving data identifying approximate locations of individual teeth in a three-dimensional digital dental model representing an impressioned position of a patient's dentition;
generating component models corresponding to individual teeth for each of the identified approximate locations, the component models being disposed at initial positions based on the impressioned position of the patient's dentition, wherein generating a component model for a specific individual tooth includes:
identifying candidate vertices based on determining an on-mesh geodesic distance between the vertices and the identified approximate location for the individual tooth;
mapping the identified candidate vertices to a two-dimensional Cartesian space; and
selecting at least some of the identified candidate vertices for inclusion in the component model based on the mapping to the two-dimensional Cartesian space;
determining target positions for the component models;
generating a tooth-positioning appliance design based on the determined target positions for the component models; and
causing a tooth-positioning appliance to be fabricated based on the tooth-positioning appliance design.

2. The method of claim 1, wherein receiving data identifying the approximate locations of individual teeth includes:
causing a user interface to be displayed that shows an occlusal view of an arch of the three-dimensional digital dental model; and
receiving user inputs via the user interface to identify points on a surface of the three-dimensional digital dental model that correspond to the approximate locations of the individual teeth.

3. The method of claim 1, wherein receiving data identifying the approximate locations of individual teeth includes:
generating a two-dimensional image representing an occlusal view of an arch of the three-dimensional digital dental model; and
identifying the approximate locations of the individual teeth using a neural network system.

4. The method of claim 3, wherein the neural network system includes a convolutional neural network.

5. The method of claim 1, wherein generating the component models corresponding to individual teeth for each of the identified approximate locations includes:
generating sub-models from the three-dimensional digital dental model based on the identified approximate locations;
classifying vertices of each of the sub-models using a neural network system; and
trimming the sub-models based on the classified vertices.

6. The method of claim 1, wherein the selecting at least some of the identified candidate vertices for inclusion in the component model based on the mapping to the two-dimensional Cartesian space includes:
finding a shortest closed loop path in the identified candidate vertices; and
using the path to identify vertices that are part of a tooth associated with the identified approximate location.

7. The method of claim 1, wherein determining the target positions for the component models includes:
determining local coordinate systems for the component models;
identifying landmarks on the component models; and
arranging the identified landmarks with respect to a target arch form.

8. The method of claim 7, wherein arranging the identified landmarks with respect to the target arch form includes orienting the component models so as to orient the local coordinate systems of the component models in a specific relationship to the arch form.

9. The method of claim 7, wherein the landmarks of the component models are identified using a neural network system.

10. The method of claim 1, wherein causing the tooth-positioning appliance to be fabricated includes transmitting data corresponding to the tooth-positioning appliance design to a rapid fabrication machine.

11. The method of claim 1, further comprising:
determining intermediate positions of the component models along a movement path between the initial positions and the target positions; and
generating an intermediate tooth-positioning appliance based on the tooth-positioning appliance design.

12. The method of claim 1, further comprising:
selectively adding structural elements to at least some of the component models based on differences between the initial positions and the target positions.

13. A system comprising:
at least one memory including instructions; and
at least one processor that is operably coupled to the at least one memory and that is arranged and configured to execute instructions that, when executed, cause the at least one processor to:
receive a three-dimensional digital dental model representing an impressioned position of a patient's dentition;
receive data identifying approximate locations of individual teeth within the three-dimensional digital dental model;
generate component models corresponding to individual teeth for each of the identified approximate locations, the component models being disposed at initial positions based on the impressioned position of the patient's dentition, wherein generating the component models includes:
generating sub-models from the three-dimensional digital dental model based on the identified approximate locations;
classifying vertices of each of the sub-models using a neural network system; and
trimming the sub-models based on the classified vertices;
determine target positions for the component models;
generate a tooth-positioning appliance design based on the determined target positions for the component models; and
transmit data corresponding to the tooth-positioning appliance design to a rapid fabrication machine.

14. The system of claim 13, wherein the instructions that cause the processor to receive data identifying the approximate locations of individual teeth include instructions that cause the processor to:

cause a user interface to be displayed showing an occlusal view of an arch of the three-dimensional digital dental model; and receive user inputs via the user interface to identify points on a surface of the three-dimensional digital dental model that correspond to the approximate locations of the individual teeth.

15. The system of claim 13, wherein the instructions that cause the processor to receive data identifying the approximate locations of individual teeth include instructions that cause the processor to:

generate a two-dimensional image representing an occlusal view of an arch of the three-dimensional digital dental model; and identify the approximate locations of the individual teeth using a neural network system that includes a convolutional neural network.

16. The system of claim 13, wherein the instructions that cause the processor to generate the component models corresponding to individual teeth for each of the identified approximate locations include instructions that cause the processor to:

generate sub-models from the three-dimensional digital dental model based on the identified approximate locations;

classify vertices of each of the sub-models using a neural network system; and trim the sub-models based on the classified vertices.

17. The system of claim 13, wherein the instructions that cause the processor to determine the target positions for the component models include instructions that cause the processor to:

determine local coordinate systems for the component models;

identify landmarks on the component models using a neural network system; and arrange the identified landmarks with respect to a target arch form.

18. A method comprising:

generating component models from a three-dimensional digital dental model of a patient's dentition using a neural network system, the component models corresponding to individual teeth of the patient, wherein the generating component models includes:

generating a two-dimensional image representing an occlusal view of an arch of the three-dimensional digital dental model; and identifying approximate locations of the individual teeth in the two-dimensional image using the neural network system;

determining target positions for the component models;

generating a tooth-positioning appliance design based on the determined target positions for the component models; and causing a tooth-positioning appliance to be fabricated based on the tooth-positioning appliance design.

19. The method of claim 18, wherein generating the component models from the three-dimensional digital dental model includes classifying at least some of the vertices of the digital dental model using the neural network system.

20. The method of claim 18, wherein determining the target positions for the component models includes:

determining local coordinate systems for the component models;

identifying landmarks on the component models; and arranging the identified landmarks with respect to a target arch form.

* * * * *